United States Patent [19]
Hirsch et al.

[11] Patent Number: 5,566,326
[45] Date of Patent: Oct. 15, 1996

[54] COPY FILE MECHANISM FOR TRANSFERRING FILES BETWEEN A HOST SYSTEM AND AN EMULATED FILE SYSTEM

[75] Inventors: Thomas S. Hirsch, Bedford; Richard S. Bianchi, Billerica, both of Mass.; Ron B. Perry, Wilton, N.H.; Kenneth J. Buck, Tyngsboro, Mass.

[73] Assignee: Bull HN Information Systems Inc., Billerica, Mass.

[21] Appl. No.: 311,652

[22] Filed: Sep. 23, 1994

Related U.S. Application Data

[63] Continuation-in-part of Ser. No. 128,456, Sep. 28, 1993.
[51] Int. Cl.⁶ .......................... G06F 12/14; G06F 15/16; H04L 9/00
[52] U.S. Cl. .................. 395/500; 395/187.01; 380/23; 380/25
[58] Field of Search ................................ 395/500, 700, 395/600, 800, 650, 187.01, 821; 380/4, 25, 23; 340/825.31, 825.34

[56] References Cited

U.S. PATENT DOCUMENTS

| | | | |
|---|---|---|---|
| 4,509,122 | 4/1985 | Agnew et al. | 395/500 |
| 4,742,450 | 5/1988 | Duvall et al. | 395/700 |
| 4,918,653 | 4/1990 | Johri et al. | 395/650 |
| 4,945,468 | 7/1990 | Carson et al. | 395/700 |
| 5,014,192 | 5/1991 | Mansfield et al. | 395/650 |
| 5,032,979 | 7/1991 | Hecht et al. | 395/187.01 |
| 5,109,515 | 4/1992 | Laggis et al. | 395/650 |
| 5,204,961 | 4/1993 | Barlow | 395/187.01 |
| 5,235,642 | 8/1993 | Wobber et al. | 380/25 |
| 5,239,648 | 8/1993 | Nukni | 395/600 |
| 5,263,157 | 11/1993 | Janis | 395/200.06 |
| 5,428,795 | 6/1995 | Johnson et al. | 395/728 |
| 5,455,953 | 10/1995 | Russell | 395/739 |

*Primary Examiner*—Gopal C. Ray
*Attorney, Agent, or Firm*—Faith F. Driscoll; John S. Solakian

[57] ABSTRACT

A host data processing system which includes a plurality of input/output devices operates under the control of an enhanced version of the UNIX operating system. The host system includes an emulator which runs as an application process for executing user emulated system (ES) application programs. The emulator includes a number of emulated system executive service components operating in shared memory and an interpreter, an emulator monitor call unit (EMCU) and a number of server facilities operating in the host memory. The ES executive service command handler and file management components are extended to accommodate dual decor copy command which invokes the file management component to copy files in either direction between the host system and emulated system. The server facilities include mechanisms for performing a trusted user level validation when the dual decor copy command is invoked and access control checking at file access which ensures security relative to preventing both unauthorized user access and compromises in user data through improper use of the copy command.

21 Claims, 7 Drawing Sheets

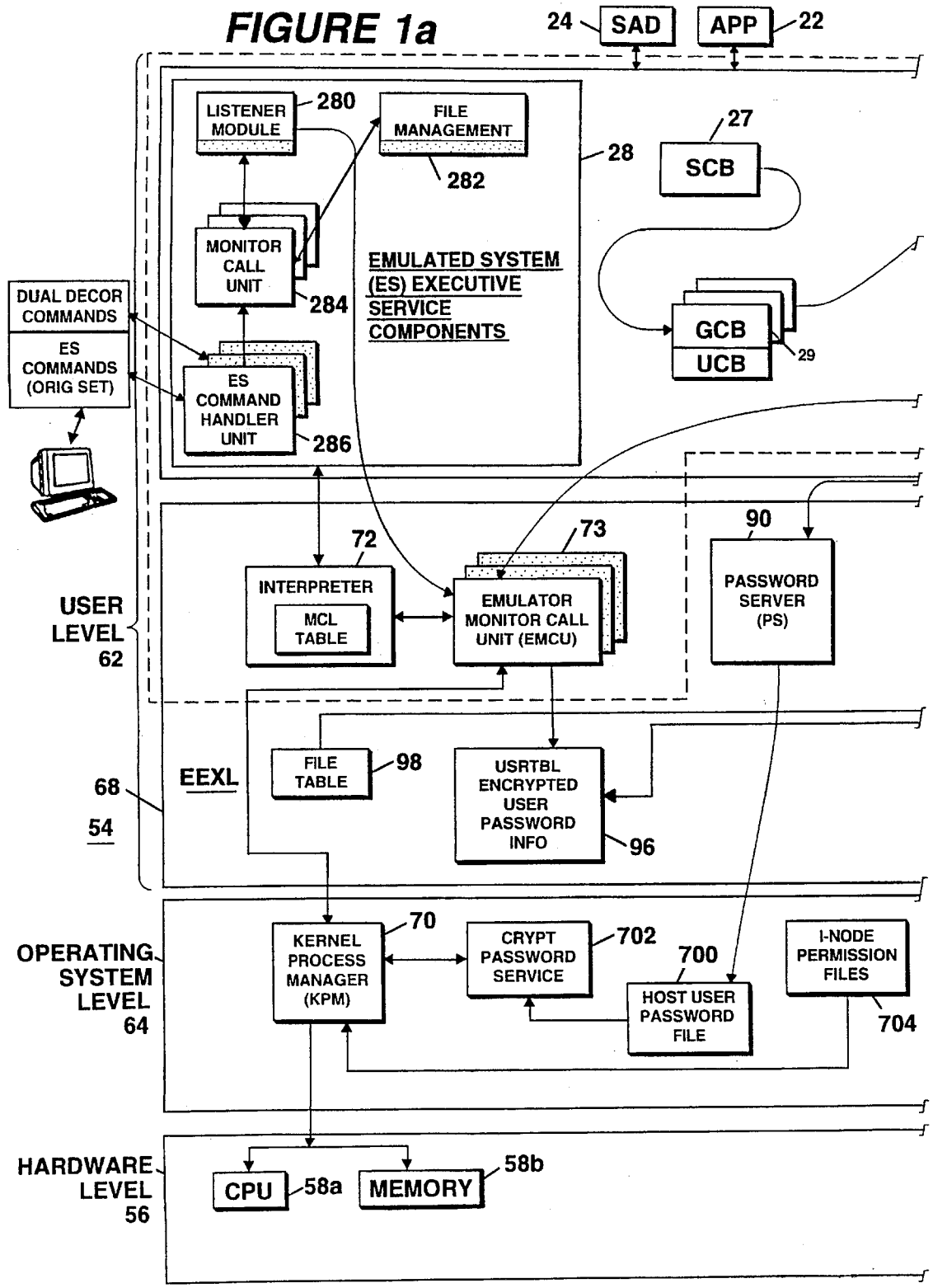

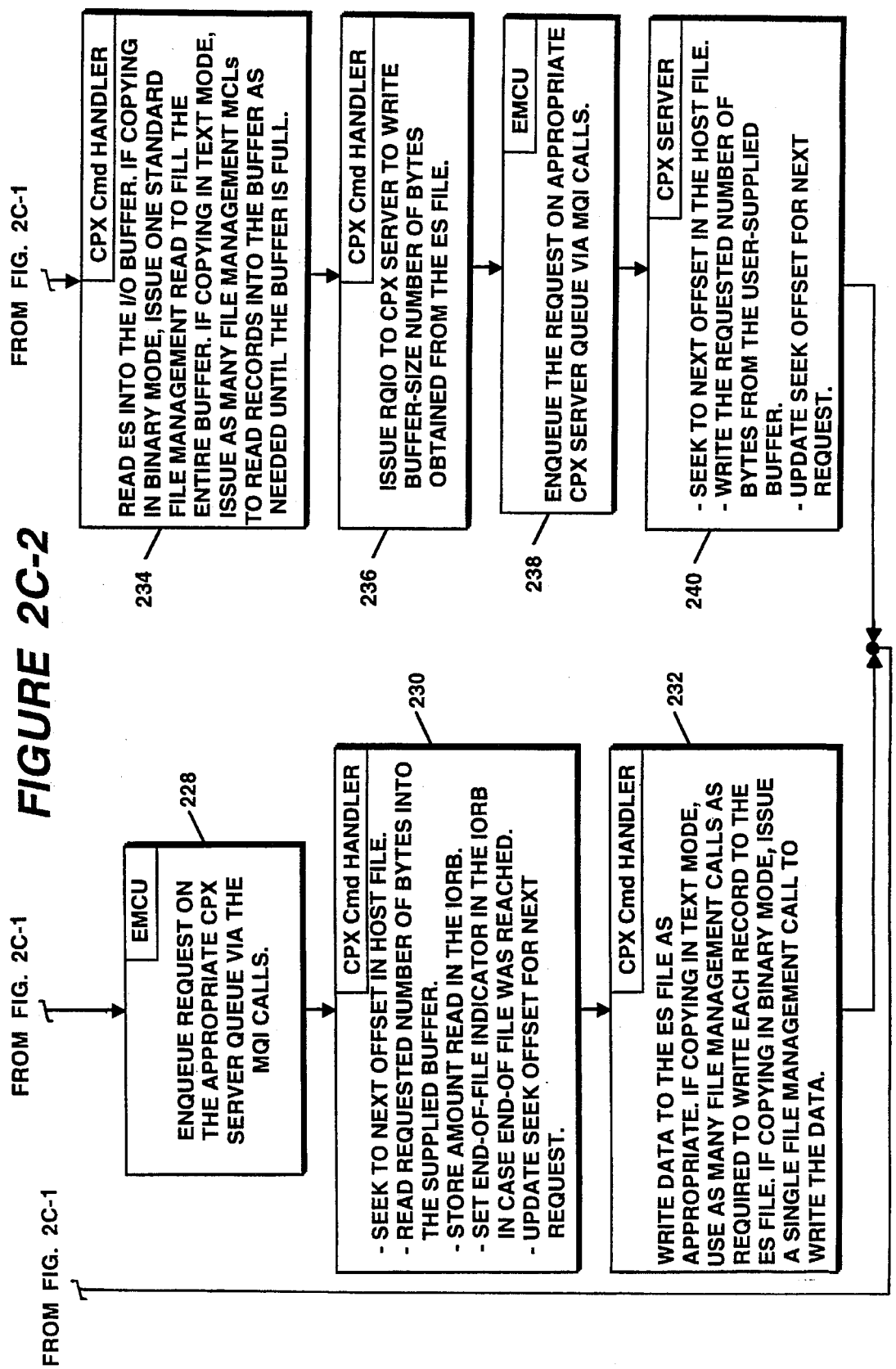

COPY FILE MECHANISM FOR TRANSFERRING FILES BETWEEN A HOST SYSTEM AND AN EMULATED FILE SYSTEM

This is a Continuation-in-Part of copending patent application Ser. No. 08/128,456, filed on Sep. 28, 1993.

RELATED APPLICATION(S)

1. The patent application of Richard S. Bianchi, Thomas S. Hirsch and Ron B. Perry entitled, "A Dual Decor Capability for a Host System which Runs Emulated Application Programs to Enable Direct Access to Host Facilities for Executing Emulated System Operations," filed on Sep. 23, 1994, bearing Ser. No. 08/311,655 which is assigned to the same assignee as this patent application.

2. The patent application of John L. Curley, Thomas S. Hirsch, James W. Stonier and Kin C. Yu entitled, "A Mechanism for Enabling Emulation System Users to Directly Invoke a Number of Host System Facilities for Executing Host Procedures Interactively or Non-Interactively," filed on Sep. 23, 1994, bearing Ser. No. 08/311,649 which is assigned to the same assignee as this patent application.

3. The patent application of Thomas S. Hirsch, Richard S. Bianchi and Ron B. Perry entitled, "A Mechanism for Linking Together the Files of Emulated and Host System for Access by Emulated System Users," filed on Sep. 23, 1994, bearing Ser. No. 08/311,646 which is assigned to the same assignee as this patent application.

BACKGROUND OF THE INVENTION

1. Field of Use

The present invention relates to the emulation of one computer system by another computer system, and more particularly to software emulation.

2. Prior Art

With the rapid evolution of higher speed computer systems and new microprocessor chip designs, users now have even a greater need to have their application programs written for a specific computer system run on different computer systems. Moreover, it becomes more important than ever to provide this capability without having to convert or port such application programs. Therefore, a number of vendors have developed both hardware and software approaches to achieve this result without having to convert or port such application programs.

One prior art system achieves the above by providing the capability of running a plurality of different operating systems. Each operating system is defined as having an interior decor and are utilized by an apparatus which isolates the operating systems and ensures that only the instructions of the currently active operating system are executed. This system is disclosed in U.S. Pat. No. 4,530,052 to James L. King entitled, "Apparatus and Method for a Data Processing Unit Sharing a Plurality of Operating Systems" which issued on Jul. 16, 1985 and is assigned to the assignee named herein. This system has the limitation of not being able to run more than one operating system at a time.

Another prior art system provides a plurality of central processing units each of which tightly couples together and utilizes a different type of operating system. The central processing units in combination with their operating systems operate in a peer relationship in which all systems have access to all system resources. To ensure the integrity of the most secure of the operating systems (i.e., deemed the proprietary operating system), certain mechanisms are included in the system for enforcing certain restrictions on the other less secure operating system (i.e., deemed the non-proprietary operating systems). These restrictions are that a non-proprietary operating system can only access memory allocated by the proprietary operating system and can use only those channels and input/output instructions specifically assigned by the proprietary operating system. Stated differently, mechanisms are provided to prevent the intentional or unintentional use of resources not assigned to the particular central processing unit and operating system combination.

The above system is disclosed in U.S. Pat. Nos. 5,027,271 and 5,230,065 invented by John L. Curley, et al. entitled, "Apparatus and Method for Alterable Resource Partitioning Enforcement in a Data Processing System Having Central Processing Units using Different Operating Systems" and "Apparatus and Method for a Data Processing System Having a Peer Relationship Among a Plurality of Central Processing Units" which issued on Jun. 25, 1991 and Jul. 20, 1993, respectively, and are assigned to the same assignee as named herein. It will be noted that while this system enables the running of more than one operating system, it requires the use of separate independent central processing units and mechanisms for enforcing the use of only assigned system resources.

When running different operating systems within a system, it becomes desirable to provide a user with the capability of utilizing both systems in an efficient manner. In the prior an system of U.S. Pat. No. 5,230,065, a user is allowed access to both operating systems through a user registration process performed on the proprietary operating system whose results are then transferred to the non-proprietary operating system. When a user has been registered on the proprietary operating system as having access to both systems, the user can issue a special switch command which switches the user's terminal over to the non-proprietary operating system. The switch command allows permanent access (i.e., access until logout from the current session) or temporary access (i.e., access to execute a single command) to the non-proprietary operating system. During this access, the user is able to issue commands while running on the non-proprietary operating system which may for example allow the transfer of data to the other operating system. For a further description of this system and operations, reference may be made to the publication entitled "GCOS6 HVS6 PLUS XC Processor Systems Basics" published by Bull HN Information Systems Inc., dated December, 1991, order number LH39-02.

While the above prior an arrangement allows a user access to both operating systems, such access takes place at the user level while both operating system maintain their independent mode of operation. It will be noted that this type of access capability can only be invoked at a high level and still requires user interaction with both operating systems as independent entities. Hence, this capability was in effect built on top of both operating systems, relying heavily on a user's ability to issue the proper sequence of commands to both systems for the execution of the appropriate procedures by each operating system. This arrangement is less efficient since it can be very cumbersome and time consuming to use.

Further, the above prior art arrangement does not provide for stringent security enforcement within both operating systems. That is, the proprietary operating system validates security as to unauthorized access for the entire system through the proprietary operating system's log-in mechanism. As to security for preventing compromises in data, the system includes mechanisms which enable the proprietary operating system to enforce resource restrictions on the non-proprietary system. Thus, this type of approach would not be effective in systems such as that of the present invention in the case where the application programs being run on the proprietary operating system are the application programs which are required to be emulated by the host system.

Furthermore, in the type of prior art proprietary operating system contemplated, information disclosing a substantial part of the organization of the operating system and its associated data structures historically have been made accessible to users. Therefore, it is likely that a knowledgeable user could intentionally or unintentionally alter the operating system data structures defining the user's identity and data access rights to gain access to other user system data files. Since this type of activity would go undetected in the prior art system and therefore unpreventable, this would result in significant compromises in system security.

Accordingly, it is a primary object of the present invention to provide access to host file system facilities for more efficient execution of application programs being emulated on a host system.

It is another object of the present invention to provide a method and system which enables application programs running in an emulation environment on a host system to be efficiently executed in a highly secure manner.

It is still another object of the present invention to provide a method and system for executing application programs running in an emulation environment on a host system which requires no changes to the host system operating system facilities thereby facilitating software enhancement and support.

SUMMARY OF THE INVENTION

The above and other objects of the present invention are achieved in a preferred embodiment of the host data processing system of the present invention which includes a plurality of input/output devices and operates under the control of a non-proprietary operating system. In the preferred embodiment, the operating system is an enhanced version of the UNIX* operating system known as the AIX operating system developed by IBM Corporation. The host system includes an emulator which runs as an application process for executing user emulated system (ES) application programs which in the preferred embodiment were originally written for use on the DPS6 and DPS6000 family of computers and the GCOS6* and HVS operating systems developed by Bull HN Information Systems Inc.

* UNIX is a registered trademark in the United States and other countries, licensed exclusively through X/Open Company Limited.
** AIX is a registered trademark of International Business Machines Corporation.
*** GCOS is a registered trademark of Bull HN Information Systems Inc.

The emulator includes a number of emulated system executive service components (e.g., HVS executive service components) operating in ES and host system shared memory environment and an interpreter, an emulator monitor call unit (EMCU) and a number of server facilities operating in the host system memory environment. The ES executive service command handler and file management system components are extended and modified to accommodate a dual decor copy command which invokes the file management component to copy files in either direction between the host system and emulated system file systems.

The EMCU includes mechanisms for performing an initial level security validation operation which allows subsequent trusted verification of user identity when dual decor commands or functions are invoked. The server facilities include mechanisms for performing a two step security validation process for ensuring security relative to preventing both unauthorized user access and compromises in user data through improper use of dual decor commands or functions. The first step validates security at the user level and the second step validates security at the file level.

More specifically, first, the system validates that the user invoking the operation is in fact a trusted dual decor user. This is carried out by using a unique encrypted description entry of each dual decor user which was previously stored in a user table located in the host memory environment which is inaccessible to ES users. The storing of the entry is done as part of the login procedure in which the ES system, upon verifying that the user is a dual decor user, issues a special monitor call to the EMCU. After validating that the special monitor call came from the proper source, the EMCU verifies that the user is an authorized host system user through the host encrypted password facilities. Once the user identity has been authenticated, the ES system creates the appropriate entry in the user table, which uniquely defines the personality of the user.

In accordance with the present invention, this encrypted description entry has three basic parts or components. These are: the emulated system user id itself which, during the log-in procedure, was established as matching the host user identification; the address of a first emulated system data structure defining the location of the user control block (UCB) and the address of a second emulated system data structure defining the location of the group control block (GCB). The addresses of each set of these data structures are uniquely assigned to a user by the appropriate ES system component during login and only a single copy for any given ES user exists in memory. By maintaining this set of uniquely assigned addresses of these data structures and associating them with the user id, the system of the present invention is now able to determine during the first step of the verification that the user is a trusted dual decor user at the point when the dual decor copy command is invoked by the user.

The user personality is validated by the EMCU confirming that original description or personality of the user has not been changed. That is, the user has not changed the user id so that it no longer is associated with the same set of UCB and GCB originally assigned addresses indicating that the user's personality has been changed.

If the user description is established as being valid, then the required type of server facilities are created or assigned and necessary connections are made between the server facilities and the ES component which initiated the dual decor copy command operation.

If the system determines that the user invoking the dual decor copy command is not a legitimate dual decor user, the system takes no further action (i.e., does not establish the necessary connections) to execute the dual decor command or function. Thus, there is no way for the user to have the command executed thus ensuring security. The user is notified of the violation by the file management system which initiated the operation.

The second step is performed by the server facilities at the file or directory level at file access time (open) using the built-in file protection mechanisms of the host system to compare the user permissions within the group to which the user belongs against the permissions associated with the data files to be accessed to verify that they are correct. If correct, the requested operation is allowed to proceed. If the user is determined as not having the required level of permission, the server facilities do not perform the requested operation and the user is notified of the access security violation.

In the preferred embodiment, a dynamic server handler (DSH) included as part of the server facilities performs the first step of the security validation operation for essentially all of the different types of dual decor commands and functions. The access check step is performed at a lower level by a server assigned or created by the DSH unit to perform the particular dual decor copy operation. Access control checking is done at a lower level where it can be executed by the specific type of server designed to handle that operation and for more effective validation of each type of dual decor file access requests (e.g., open, read, write). For example, this arrangement ensures security in those situations where it is not possible to determine the type of access being requested by a particular user before an initial phase of the operation is allowed to take place.

In accordance with the teachings of the present invention, a number of different types of files are handled by the dual decor copy command. Additionally, the copy command also permits establishing an assignable block size which enables file transfers to be more efficiently handled.

BRIEF DESCRIPTION OF THE DRAWINGS

FIGS. 2a, 2b, 2c-1, 2c-2 and 2d are flow diagrams used to explain the operation of the present invention.

DESCRIPTION OF THE PREFERRED EMBODIMENT

Figure 1B:
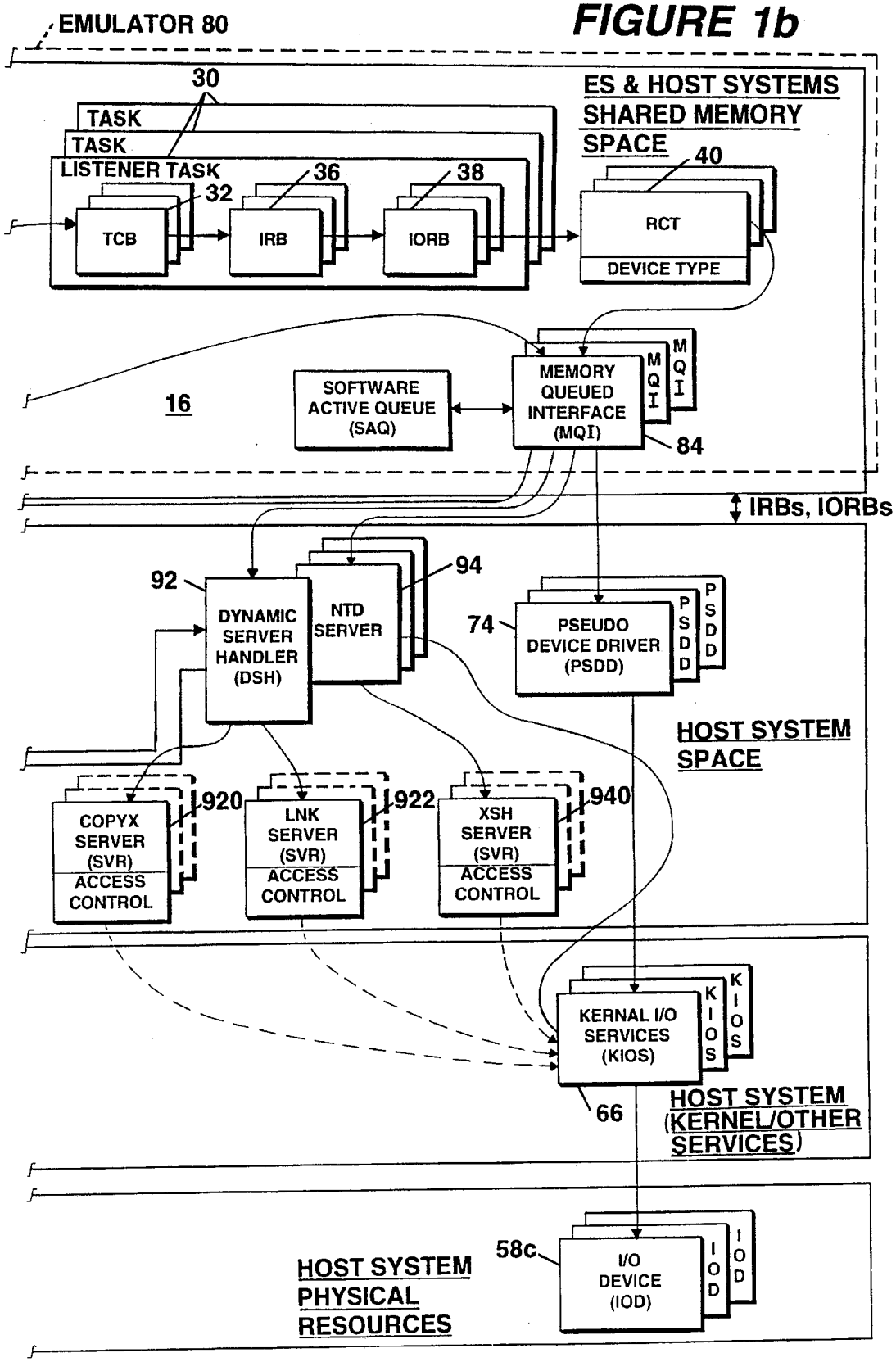
FIG. 1 which is made of FIGS. 1a and 1b is a block diagram of a host system which incorporates the dual decor copy command of the present invention.
Figure 2A:
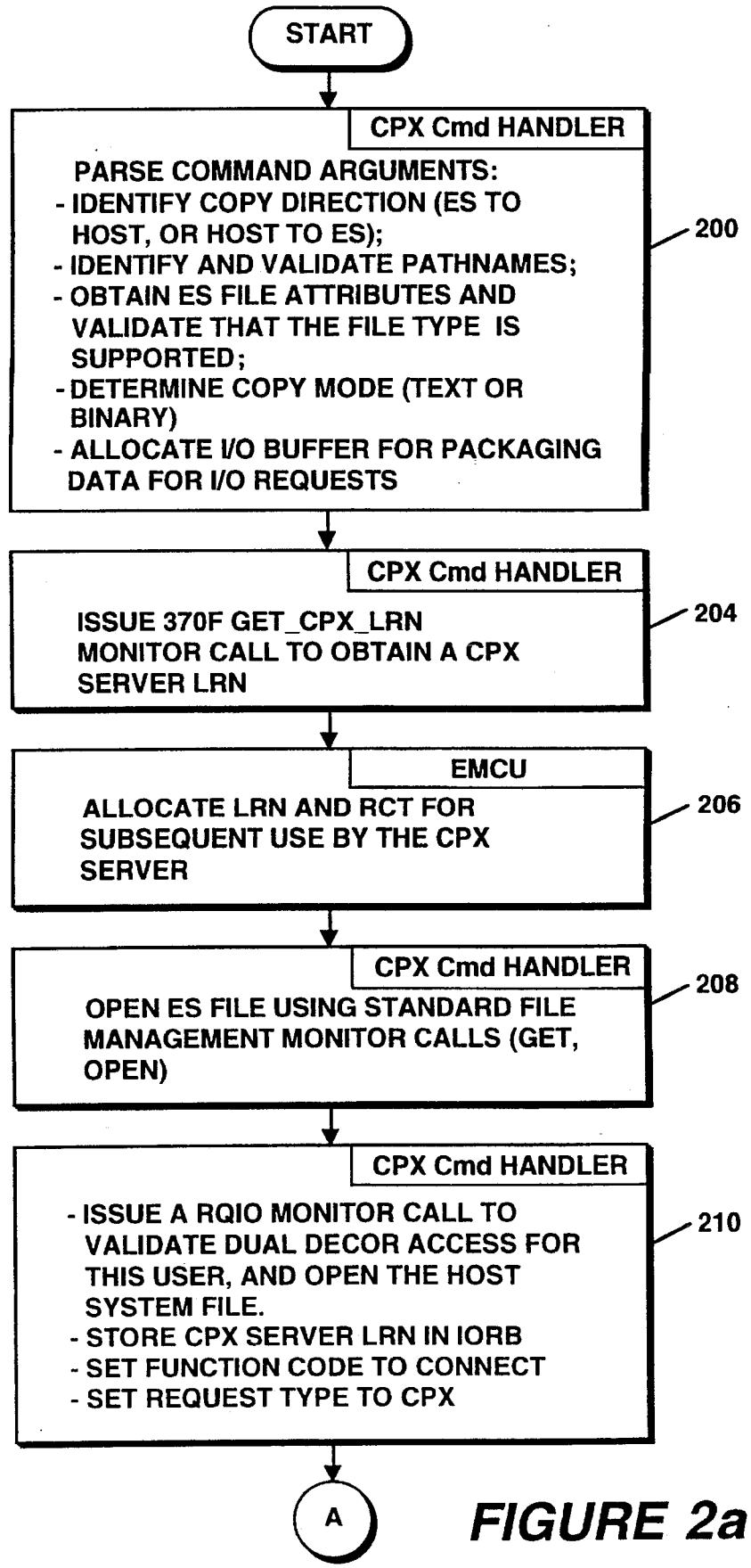
Figure 2B:
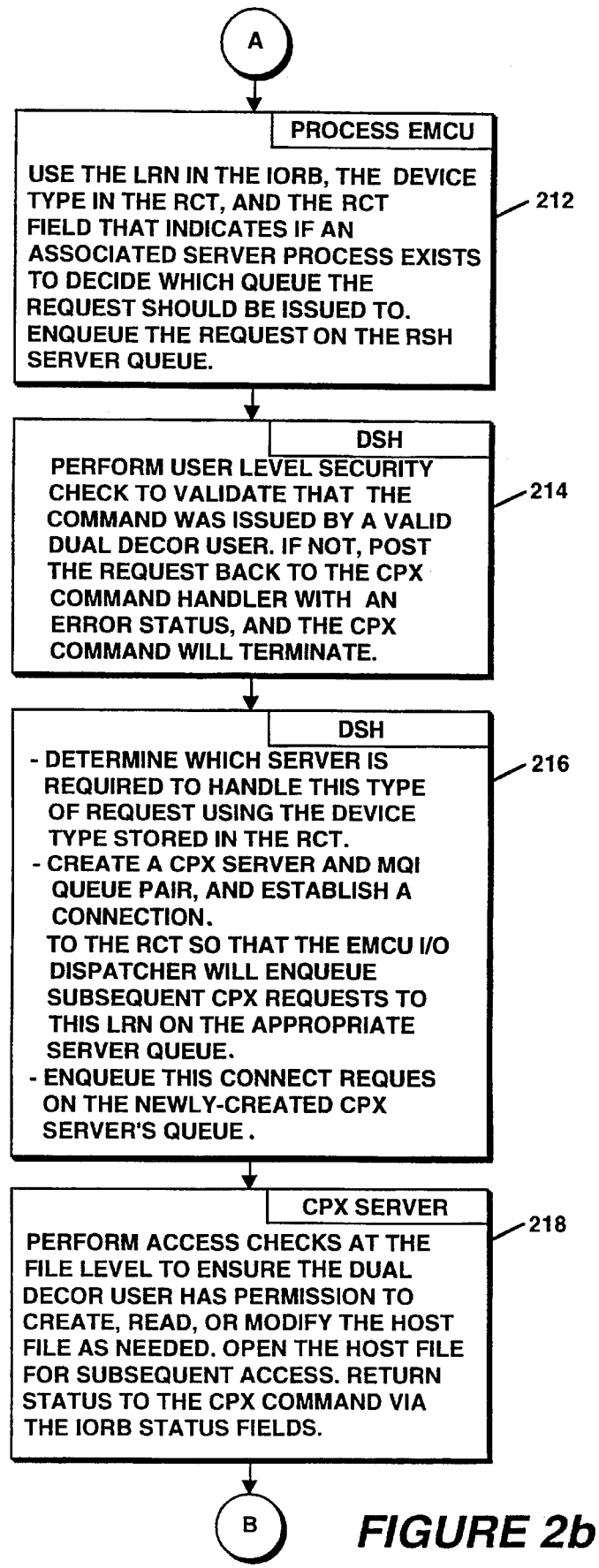
Figures 1, 2C:
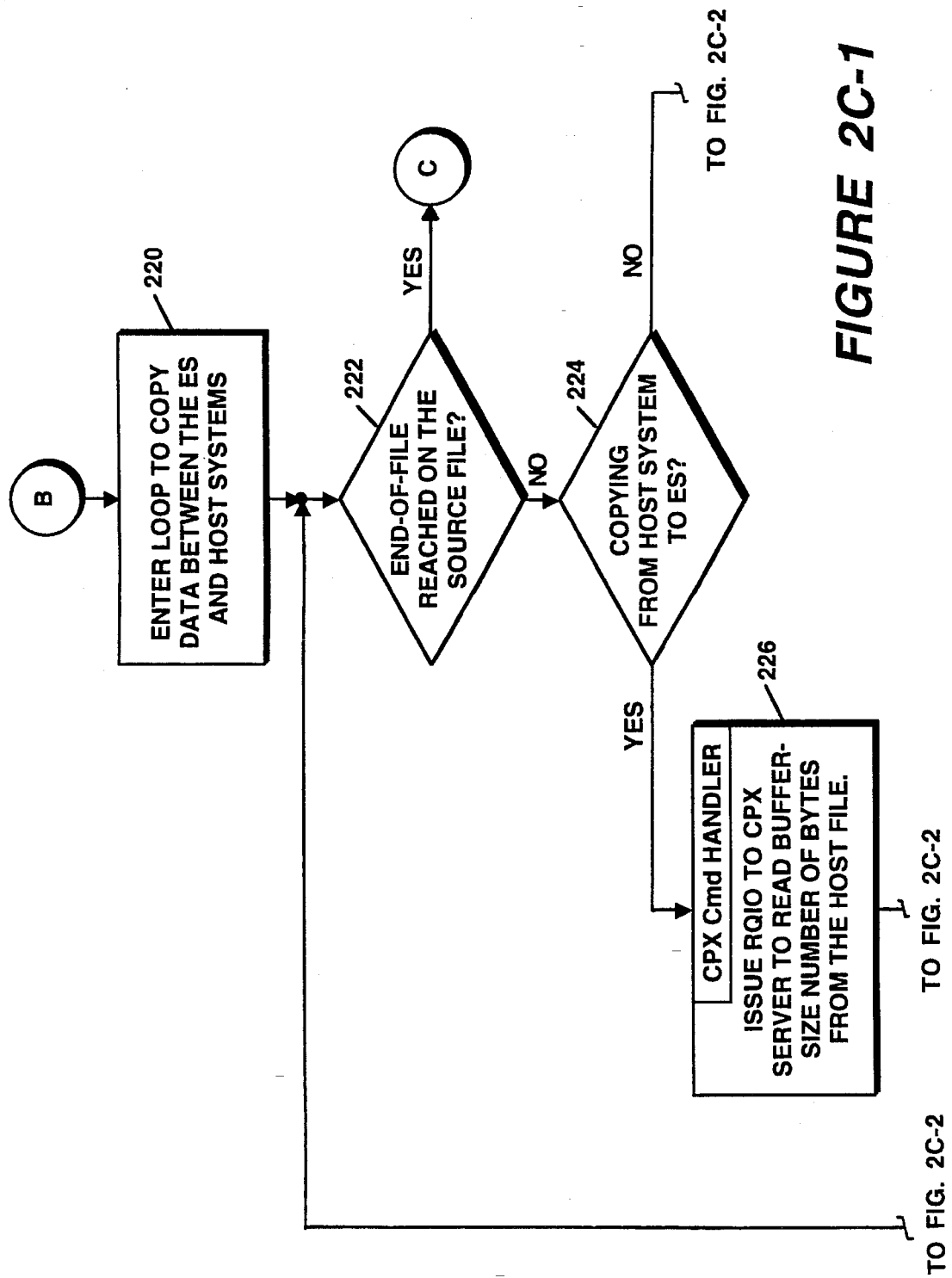

FIG. 1 is a block diagram of a host system 54 which incorporates the dual decor components of the present invention. As shown, the system 54 includes a hardware platform 56 which contains the hardware elements such as a central processing unit 58a, a main memory 58b and a number of input/output peripheral/communications devices including a local area network for connecting system 54 to other processing systems via standard communication network facilities.

The central processing unit (CPU) represented by block 58a is a reduced instruction set (RISC) based processing unit which takes the form of the RS6000 microprocessor manufactured by IBM corporation. The hardware platform 56 may also take the form of the DPX/20 system marketed by Bull HN Information Systems Inc.

As seen from FIG. 1, hardware platform including processing unit 58a operates under the control of an enhanced version of the UNIX™ operating system such as the AIX™ operating system. Portions of physical memory represented by MEM block 58b are illustrated in terms of the layered construction. As shown, memory is divided into two basic levels, a user level and a kernel level. The user level is divided into emulated system (ES) and host shared memory space and host or native memory space. The shared memory space contains the ES executive level 16 which includes a plurality of executive program tasks 30 spawned by ES executive services components of block 28 for executing ES application programs 22 and system administrator programs 24.

In the emulated system, each task 30 utilizes a plurality of data control structures, such as a task control block (TCB) structure 32, an indirect request block (IRB) structure 36, an input/output request block (IORB) structure 38 and a resource control table (RCT) structure 40. The task control block (TCB) structure 32 contains information pertaining to the state of execution of the associated task as well as pointers to interrupt save areas for storing hardware parameters related to the task. The indirect request block (IRB) structure 36 contains information defining the operation requested by an associated task and includes pointers identifying the task and its associated task control block (TCB) and a pointer to the associated IORB structure.

The input/output request block (IORB) structure 38 is used as the standard means of requesting a physical I/O service. It contains information such as a logical resource number (LRN) that identifies the I/O device being addressed as well as the location and size of the buffer to be used for the transfer and the specific function (operation) requested. The resource control table (RCT) structure 40 contains information describing the resources, such as its characteristics or information regarding the tasks or requests being executed by a corresponding resource as well as pointers to its associated task control block (TCB) structure.

Additionally, two other structures depicted in FIG. 1 utilized by the present invention are a group control block (GCB) structure and a user control block structure of block 29. The GCB structure contains information required to define and control the operations of a specific task group which defines a named set of one or more tasks with a common set of resources within which a user and system function must operate. Each group has a two character name (e.g., $L, $S) by which the group is uniquely known to the system. The GCB structure includes information identifying the lead task whose execution spawns all other tasks required for executing group programs. As indicated, the GCB structure includes a number of user control blocks (UCB), each of which contains information defining the user's personality such as user node identification, user group id within a node, user task id within group, user person id and pointer information to directories to which the user has access.

As shown, the emulated system utilizes a further data structure corresponding to system control block (SCB) structure 27. This data structure is created at system startup and contains information defining system resources and pointers to the different task groups established by the system represented by a corresponding number of group control blocks in the system. For further information regarding such structures and their relationships to each other, reference may be made to U.S. Pat. No. 5,111,384 and the publication entitled "HVS PLUS Systems Concepts" published by Bull HN Information Systems Inc., Order No. HE03-01.

As indicated in FIG. 1, the shared memory space further includes a memory queued interface (MQI) represented by block 84 which provides a form of interprocess communication mechanism and a software active queue (SAQ) of block 88. SAQ block 88 represents a data structure used to provide the path by which the results of the operations performed by the kernel level components are passed back or returned by the host processes to the requesting emulated system user level tasks 30 being executed. Thus, it can be viewed as functioning as an output stage of MQI 84. This data structure is similar to data structures which are used by the emulated system operating system.

MQI block 84 is a semaphore data structure which takes the form of a single linked list controlled by semaphores through a set of routines which are executed by the various host processes operating within different levels or layers that want to communicate with each other. Its routines are used to manage queues within the pseudo device drivers 74 and the software active queue 88.

Executive Services Components 28

As seen in FIG. 1, the executive services components 28 of executive layer 16 includes a plurality of components or facilities which are equivalent to those facilities normally included in emulated system. The facilities utilized by the present invention include a listener module 280, a file management facility 282, a monitor call unit 284 and a ES command handler unit 286 which are arranged as shown. The listener module 280 is responsible for monitoring the operations of terminals configured for login and for initiating user processes in response to user commands. As indicated in FIG. 1, listener module 280 runs as a task 30 with its own set of unique data structures.

As described herein, the listener module 280 is able to consult a profiles file containing user specific registration information such as user id, login id and password requirements tabulated by the system administrator for all registered users. The listener module 280 checks the user profile when monitoring the privileges and/or restrictions given to each user. The file management facility 282 includes the conventional shared data structure and set of routines normally provided to perform functions that access such data structure to control the synchronization of concurrent processes or tasks in addition to performing various system services or functions. That is, the facility responds to system service monitor calls identifying the types of services requested (e.g. creating or deleting files, reading or writing records or blocks in files) which result in the specified system services being executed by the emulated system on behalf of executing user application programs.

File Management Data Structures

The ES file management component 282 utilizes a number of data structures in conjunction with carrying out file system services as described in greater detail herein. Information about a ES disk device including the device name as well as the name of the logical volume currently mounted on that device is maintained in a volume descriptor block (VDB) structure. A chain of VDB's is provided off of the SCB. The emulated system file system provides a directory tree structure within each mounted disk volume. For each file, index and directory being accessed, information is maintained in memory in a file descriptor block (FDB) structure. FDB's are organized and chained in memory in a tree structure which emanates from VDB's similar to how it is organized on the disk. FDB's contain the name of the file, links to the superior and inferior directory FDB levels as well as a link to the next FDB on the same directory level. FDB's contain logical information such as record size, key locations and sizes which allow for logical record level I/O services.

In addition, an FDB describes where (at what physical sectors) the data of the file is located and also contains information necessary to request I/O services from the appropriate device driver in the system being emulated. An FDB is created in memory as a result of a user application monitor call which reserves the file for processing and it is deleted when the application removes the file.

Also, the ES file management component 282 creates a file control block (FCB) data structure which contains information relating to a specific use of the file such as a current record pointer (e.g., one instance of opening the file).

The FCB structure is found by locating a logical file table (LFT) linked to the group control block (GCB) structure. The LFT is simply an array of pointers to FCBs. The logical file number (LFN) is assigned when the file is reserved and serves as an index into the array.

For non-disk devices such as tapes, printers and terminals, a device descriptor block (DDB) structure is maintained. A DDB contains the name of the device as well as logical information such as record size. For tapes, a DDB contains the name of the volume currently mounted on the device and the name of the file currently being accessed. A DDB also contains the physical information necessary to request I/O services from the appropriate emulated system device driver. A chain of DDBs is provided off of the SCB and this chain as other chains are created during system configuration (startup).

The monitor call unit 284 receives monitor calls from the interpreter component 72 which are in turn to be executed interpretively using the ES executive service components of block 28. The command handler unit 286 contains the routines that respond to user commands entered via a terminal or program. In response to such commands, the unit 286 routines invoke the appropriate processes for executing such commands. As discussed herein in greater detail, each of these components have been augmented or extended to incorporate different dual decor aspects or features according to the teachings of the present invention.

Emulator Level Layer 68

As indicated in FIG. 1, the next layer within the user level is the emulator executive level 68. This level includes certain components present in the emulated system which have been transformed into new mechanisms which appear to the remaining unchanged components to operate as the original unchanged components of the emulated system, At the same time, these new mechanisms appear to the components of the kernel level 64 as native components with which the host system is accustomed to operate. As shown, the components include the interpreter 72, an emulator monitor call unit (EMCU) 73, a plurality of servers 90, through 940, and a plurality of pseudo device drivers (PSDD) 74 arranged as shown.

Additionally, level 68 includes a data structure in the form of a user table (USRTBL) 96 which contains entries which uniquely define the personalities of the different dual decor users. This table is maintained to be able to determine that a given user has successfully gone through the login procedure. In accordance with the present invention, each such encrypted user description entry has three basic parts or components. These are: the emulated system user id itself which during the log-in procedure was previously established as matching the host user identification; the address of a first emulated system data structure defining the location of the user control block (UCB) and the address of a second emulated system data structure defining the location of the user group control block (GCB). The Appendix shows the format of these entries in greater detail.

The interpreter 72 successively fetches the instructions of an emulated system application program, categorizes each instruction and executes it interpretively through sequences of RISC instructions which allows CPU 58a, MEM 58b and other elements of host system 54 to emulate the operations of corresponding elements of the emulated system. The interpreter 72 includes a monitor call (MCL) table containing information for each possible monitor call which it utilizes to determine whether to trap or send an ES monitor call to the ES executive services components 28 for execution of the instruction or to make an emulator call to EMCU 73 for execution of the instruction through the services of an appropriate C language routine (server). The EMCU 73 is responsible for acquiring from the host system 54, the necessary memory and other resources, for initializing the emulated system data structures and invoking interpreter 72 and the various server processes. Both the interpreter 72 and EMCU 73 run as host processes but not as root.

As viewed by the host system, the ES service components 28 and tasks 30 being executed on behalf of the application programs, the interpreter 72 and EMCU 73 are executed in the system 54 of FIG. 1 as a single process 80 wherein such process corresponds to one or more user processes as defined by the conventions of the host operating system being run on host system 54. Thus, it is possible to have multiple instances of the emulated system concurrently emulated on host system 54.

The password server 90, the dynamic server handler (DSH) 92 and the network terminal driver (NTD) server 94 are created by EMCU 73 during initialization. Each of the servers 90, 92 and 94 communicate with emulated system processes through MQI 84 as indicated. The lower level group of servers 920, 922 and 940 are dynamically created by their respective higher level servers 92 and 94 for carrying dual decor operations according to the present invention. All of the servers operate as root and therefore have super user privileges with access to any file within the host system 54. The NTD server 94 is designed to contain the functionality required to handle different types of terminals such as the network terminal driver described in U.S. Pat. No. 4,951,245 which issued on Aug. 21, 1990.

As described in detail herein, both the servers 92 and 94 include mechanisms specifically designed for validating security at the user level in conjunction with the execution of dual decor commands and functions. As shown in FIG. 1, the lower level group of servers 920, 922 and 940, each include access control mechanisms used to validate security at the file level. In the case of server 940, host access control mechanisms are used.

As indicated in FIG. 1, the EMCU 73, dynamic server handler 92 and NTD server 94, each have access to a data structure in the form of user table (USRTBL) 96 which has been located in host space so as to be inaccessible to ES user application programs. As described herein in greater detail, the table 96 contains encrypted user descriptor information which is used for validating a user's identity according to the teachings of the present invention. The encryption ensures security in the event of a memory dump.

As indicated in FIG. 1, the emulator executive level 68 further includes a plurality of pseudo devices drivers (PSDD) 74 for each input/output device or type of input/output device which is required to be emulated by host system 54. For example, the pseudo deuce drivers 74 will include PSDDs for terminals, disk drivers, tape drivers, displays and for certain communication devices.

For a more detailed discussion of other aspects of the SAQ 88, MQI block 84, PSDD 74 and other emulator components, reference may be made to the related patent applications.

Operating System/Kernel Level

The operating system/kernel level 64 includes the standard mechanisms and components normally included within the host operating system. As shown, level 64 includes a kernel process manager component 70, a host user password file 700, a host crypt password service facility 702, Inode permission files storage 704 and a number of host kernel I/O services (KIOS) processes 66 for each pseudo device driver (PSDD) 74 which is to be emulated by the host system and for each of the sewers 920 through 940 assigned to execute dual decor commands and functions. Since the components of the kernel level 64 are well known, they are only briefly described herein. The host user password file 700 is used for storing information identifying registered host users. This file is updated and maintained by the host operating system kernel process manager 70. A part of the information stored in the password file 700 is the user encrypted password generated using the one way crypt password service facility 702 invoked by the kernel process manager 70.

Additionally, in the preferred embodiment of host system 54, level 64 is assumed to contain the standard utility programs, shell, editors, compilers, etc. and libraries (e.g., I/O libraries, open, close) which are accessed in the host user mode. For further information regarding the use of such arrangements, reference may be made to publications of the IBM Corporation describing the AIX operating system.

Host System File System

The host file system consists of a sequence of homogeneous logical blocks, each containing a convenient multiple of 512 bytes. In the host file system, the internal representation of a file is given by an Inode which is the contraction of the term index mode. The mode contains a description of the disk layout of the file data and other information such as the file owner, access permissions and file times. Every file has one Inode, but the Inode may have several names or links, all of which map into the Inode. The kernel maintains a file table and a user file descriptor table. The file table is a global kernel structure and contains information for tracking where a user's next read or write stars and the access rights allowed to the opening process. The user file descriptor table is allocated per process and contains information identifying all open files for a process. When a process opens or creates a file, the kernel allocates an entry from each table corresponding to the file's Inode. The entries in the user file descriptor table, file table and Inode table maintain the state of the file and user's access to the file.

The Inode permission files storage contains entries listing the attributes and disk addresses of each file in the system. Each Inode entry contains information about the type, size, times, ownership and disk blocks in each Inode. The directory structure in the host system uses entries, each of which contains just a file name and its Inode number. The attributes of an entry include references to access control lists (ACLs) defining the file's base and any extended permissions. The base permissions correspond to the traditional file access modes (i.e., read, write and execute/search) assigned to a file owner, file group and other users. The extended permissions designate how the base permissions have been modified in terms of permitting, denying or specifying access modes for specific individuals, groups, or user and group combinations designated by user and group ids. For the purpose of the present invention, this arrangement can be considered conventional in design. For further information regarding the use of such arrangements, reference may be made to publications of the IBM Corporation.

DESCRIPTION OF OPERATION

With reference to FIGS. 2a through 2d, the dual decor copy command incorporated into system 54 according to the teachings of the present invention will now be described. As diagrammatically illustrated in FIG. 1, dual decor commands encompass new commands and extensions to existing commands of the emulated system. The dual decor file copy command (CPX) can be viewed as a new command which allows the copying of files between the emulated system and host system.

The format of this command is:

CPX source_pathname destination_pathname [ctl_args]. The term "CPX" corresponds to a new command code which is followed by a series of arguments. The source_pathname argument is used to designate the complete path name of the file to be copied (es or host). If the file to be copied is a host file, then the host pathname must be enclosed in double quotes and star with a pathname prefix. The pathname prefix is either "x:" or "X:" (i.e., "x" may be either upper or lower case). When the pathname does not start with x: or X:, it is assumed to be an ES file. The destination_pathname argument is used to designate the complete path name of the file to be copied to. The use of x: or X: is the same as in the case of the source_pathname argument as to identifying emulated system and host system files.

The CPX copy command can include either no arguments or any of the following arguments for designating file type, emulated system file attributes or specifying how the operation is to be completed. More specifically, the control arguments -BINARY|-B|-TEXT|-T are used to specify whether the file being copied is copied as a binary file or a text (ASCII) file. The control arguments -CLONE clone_pathname|-SEQ|-S_R are used to set the file attributes of a file being created on the emulated system by the CPX command. The file attributes are set to specify one of three options. The control arguments -CLONE clone_pathname|-C clone_pathname are used to create a file having the same attributes as an existing emulated system file specified by clone_pathname. The control argument -SEQ is used to create a first type of emulated system file organization designated as a Unified File Access System (UFAS) sequential file organization which uses a sequential file with 512 byte records. The control argument -S_R is used to create a second type of emulated system file organization designated as a UFAS string-relative file having 512 byte records. When copying a file to the emulated system and no file type arguments are specified on the CPX command, the existing file type is used; if the ES file does not exist, the type "string-relative" is used. The control arguments -DELETE|-DL and -LIST|-LS respectively are used to specify that the source file be deleted after the copy is complete and to specify that confirmation messages are issued.

It will be assumed by way of example that a logged on user issues a CPX copy command line either via a terminal or execution command file specifying that a file be copied between the emulated system and host system 54. Appendix B illustrates several format examples of CPX copy commands.

Since login has already taken place, the appropriate encrypted entry will have been stored in user table 96 and hence is available for use by the CPX copy command during execution as described herein. The user entered CPX copy command invokes a command processor (not shown) included within block 28. The command processor is a system software component that reads each command line entered by the user through a terminal or from a command file and then passes it to the appropriate command handler within block 286 for execution. Since this is a new command, a CPX command handler has been added and receives the command line arguments from the command processor via a pointer.

Referring to FIG. 2a, it is seen that first, from block 200 the CPX command handler retrieves the arguments and parses them, identifying the direction of the copy operation (i.e., ES to host or host to ES), and verifying that the source and destination path names are valid and that the file type specified or derived for the ES file is valid (i.e., is a supported file type). If the copy direction is from host to ES, the ES file is created if necessary using file type information derived from the command arguments. If the copy direction is from ES to host, the host file will be created when the host file is opened by the host server. Any errors in path name or file type are reported and processing of the CPX command is terminated.

The CPX command handler also determines the copy mode for processing the file data using the specified command argument (text or binary) and the type of the ES file (String-Relative, Fixed-Relative, or UFAS Sequential, Relative, or Index-Sequential). Since the emulated system supports a variety of different file types, while the host system defines only a single file type, some mapping of file data is required when passing data between the ES and host systems. For the purposes of this discussion, emulated system files fall into three categories:

Unified File Access System (UFAS) files (such as Sequential, Indexed, and Relative) that are made up of data 'records' contained within blocks known as 'control intervals', that contain file system overhead information (such as record length, record linkage information, etc.) between the data records in the file. Records in these file types may contain either text or binary information.

Fixed-Relative files, which are usually used for binary information and contain fixed length records with no overhead information separating the records.

String-Relative files, which are usually used for text information; records are separated with a new line character (ascii hex code 0A).

In the host system, text file records are separated by a new line character, while binary file records are not separated from each other.

When copying a file between the emulated system and the host system, the copy mode argument (binary or text) is used in conjunction with the ES file type to determine whether or not record overhead information should be copied along with the file data. For files copied in text mode, record separator information is translated or generated to be appropriate for the environment in which the file will reside; this allows text files to be processed by programs (such as text editors) that reside in the environment into which the file is copied. When the copy mode is set to binary, files are copied in block mode, so any record overhead information present in an ES file will be copied to the host file without modification. The above is summarized as follows:

| File Type | Record Overhead Exists? | Copy Mode | Copy Record Overhead? |
| --- | --- | --- | --- |
| String Relative | N | Binary | N |
|  |  | Text | N |
| Fixed Relative | N | Binary | N |
|  |  | Text | N |
| UFAS Sequential | Y | Binary | Y |
|  |  | Text | N |
| UFAS Indexed Seq | Y | Binary | Y |
|  |  | Text | N |
| UFAS Relative | Y | Binary | Y |
|  |  | Text | N. |

As indicated in FIG. 2a, next the CPX command handler issues a special dual decor monitor call (MCL370F) to EMCU 73 (block 204). The EMCU 73 obtains the LRN and resource control table (RCT) entry which is to be used in communicating with the CPX server 920. More specifically, an area of shared memory is reserved for a given number of RCT/TCB structure pairs which are dynamically allocated for handling dual decor commands and functions. The dual RCT/TCB pairs are initialized and each pair is attached to an LRN. All of the RCTs are linked together onto a free queue. The 370f monitor call is used to request an LRN and removes an RCT/TCB pair from the free queue. Next, the EMCU 73 allocates the LRN and RCT for subsequent use by the CPX server (i.e. block 206).

Next, as indicated in FIG. 2a, the CPX command handler opens the ES file via standard ES file system monitor calls (i.e. block 208). This involves issuing the appropriate get file command to reserve the file at which time the file management component 282 checks the user access fights to the file in the same manner as in the emulated system.

As seen from FIG. 2a, next the CPX command handler initiates an open of the host file by issuing a low level request I/O (RQIO) monitor call accompanied by an IORB having its LRN field set to the LRN for the CPX server 920 and its function code field set to specify CONNECT (i.e., a physical connect operation) and the operation type set to CPX (i.e. block 210).

As seen from FIG. 2b, since this is an RQIO monitor call and since the RCT entry corresponding to its LRN indicates that no server process has yet been created, the EMCU 73 enqueues the IORB onto the MQI queue section of the dynamic server handler 92 in the manner indicated (i.e. block 212). In response to the RQIO monitor call, the DSH92 determines from the IORB that it is associated with a dual decor CPX operation and that it contains the CONNECT function code. In accordance with the present invention, DSH92 performs a user level security check for determining that the dual decor CPX command was issued by a trusted user (i.e. block 214). This operation which is described in great detail in the first referenced copending patent application is carried out by verifying that the personality of current user is the same as the user description stored in user table 96 as a result of the login procedure. This ensures that system security remains intact in that an individual other than the user is not attempting to gain unauthorized access to system files.

Assuming that the personality of the user is validated, then the DSH92 takes steps to establish the connection between the component issuing the dual decor command and the CPX server 920. This involves issuing host system calls to the kernel manager 70 in the form of a fork system call which creates a new host process and an exec system call which invokes the CPX server 920 to be run by the host new process. Also, DSH92 creates a CPX server and MQI queue pair and establishes a connection to the RCT so that the EMCU 73 can enqueue subsequent CPX requests to this LRN on the appropriate server queue (i.e. block 216).

As indicated in block 218 of FIG. 2b, the CPX server 920 process in response to the IORB CONNECT function code performs a file level access check to verify that the host user personality verified by DSH92 has the required permissions to access the host file designated in the CPX command and performs the specified operation (i.e., read or write). This is carried out by issuing system calls to the kernel manager 70 through a get access routine which determines whether or not the user has the required basic and extended permissions by the information stored in the Inode permission of block 704. Next, the CPX server process issues an open systems call to the kernel manager 70 which causes the kernel I/O services component 66 to open the host file designated by the CPX command.

As indicated in FIG. 2c, the CPX command handler enters a loop which repeats a series of operations for copying the file between the emulated system and host system 54 in the direction specified by the CPX command (i.e. block 220). The loop is repeated until all of the data from the input file has been copied. As indicated, the series of operations involve generating the standard ES file system monitor calls to file management component 282 for each ES file access and generating a low level Request I/O (RQIO) monitor call to EMCU 73 having its LRN value set to the LRN of CPX server 920 and its function code set to designate the operation to be performed on the host file (i.e., read or write operation as appropriate) (i.e. blocks 222 through 240).

For performance reasons, the contents of the file being copied are packaged into a large memory buffer to reduce the number of RQIO monitor calls needed for copying the file. The buffer size is set to 32767 bytes (the maximum i/o range supported by the RQIO interface) rounded down to a multiple of the ES file block size. Additional space large enough to hold the maximum size record in the ES file is included at the end of the buffer for use when reading from the ES file into the buffer.

When copying a file from the emulated system to the host system, a loop is executed to issue multiple calls to read records or blocks as needed to fill the buffer prior to each RQIO call. If the ES file is being processed in block mode, a single call to the ES file management component can be issued to fill the entire block. If the ES file is being processed in record mode, successive calls must be issued the ES file management component to read each record from the file into the buffer. Since ES file records may have variable length and it is not possible to know the actual size of a record before reading it, it is possible that the last record read into the buffer may extend beyond the end of the buffer; in this ease, only part of the record will be included in the current RQIO request, and the remainder of the record is retained and placed at the front of the buffer for the next call. These operations are illustrated in blocks 234 through 240 of FIG. 2c.

When copying a file from the host system to the emulated system, RQIO calls are issued to read data in units equal to the buffer size, after which records or blocks are extracted from the buffer and written to the ES file. When copying data in this direction, a partial record may have been truncated at the end of the i/o buffer, in which case it is retained and concatenated with the results of the next read call. These operations are illustrated in blocks 226 through 232 of FIG. 2c. Also, any required mapping operation is performed as a function of the file types specified by the CPX command so as to provide the data in the appropriate format.

Each RQIO monitor call and associated IORB structure subsequently received by EMCU 73 are examined. Upon determining from the LRN value that the CPX server process has been created, EMCU 73 enqueues the IORB onto the CPX server MQI queue for processing. As indicated, the CPX server process upon receipt of the request I/O, issues a host system file i/o call to the kernel I/O services of block 66 specifying the appropriate operation (i.e., read or write) according to the IORB structure.

Figure 2D:
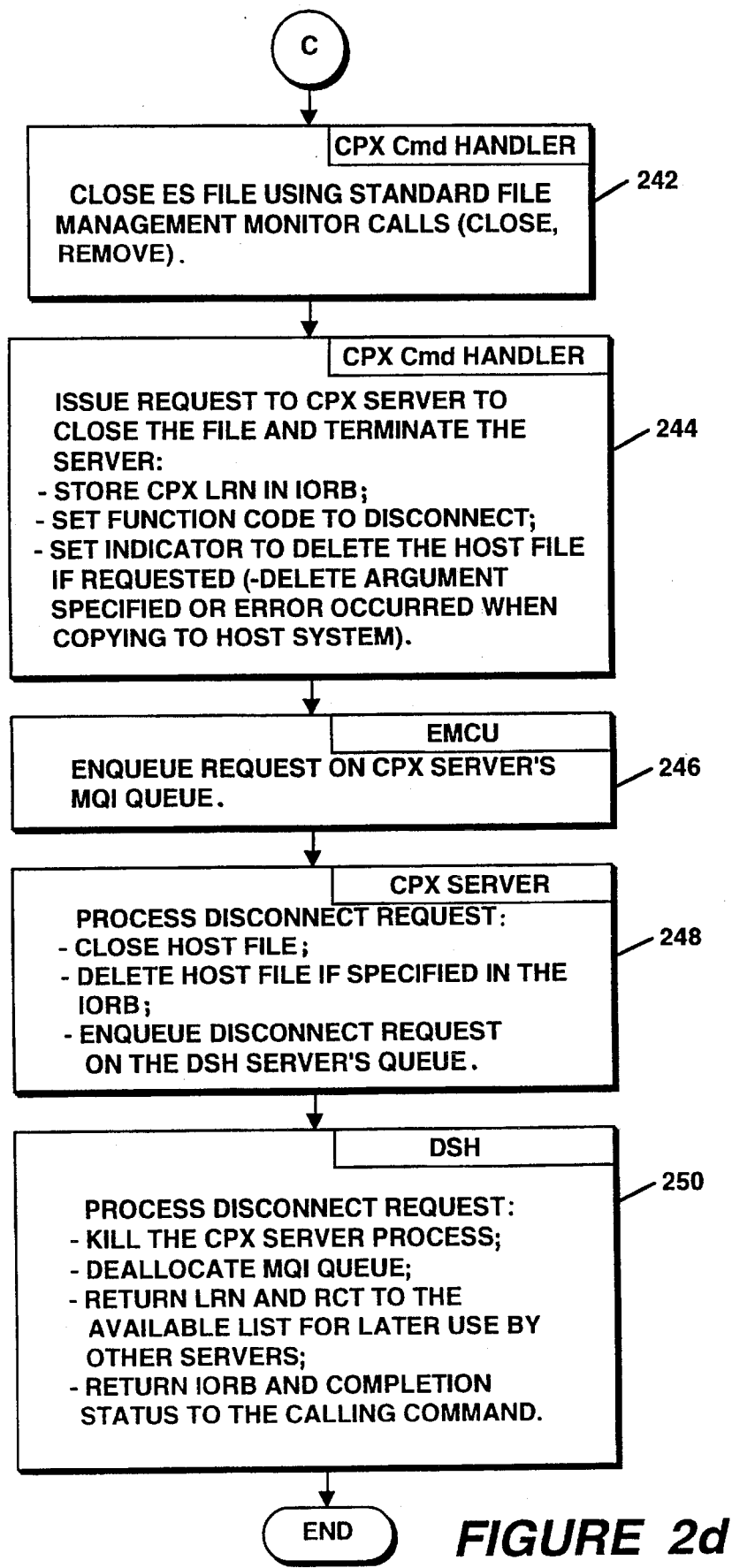

This series of operations are repeated until all of the input file data has been copied as signaled by file management component 282. As indicated in FIG. 2d, upon receipt of such indication, the CPX command handler issues a series of standard ES file system monitor calls to file management component 282 to close the ES file (i.e., close and remove file commands) (i.e. block 242). It also issues a low level request I/O (RQIO) monitor call and associated IORB to EMCU 73 which has its LRN field value set to the CPX server 290 and its function code set to specify a physical DISCONNECT (i.e. block 244).

EMCU 73 enqueues the IORB onto the MQI queue of CPX server 920 (i.e. block 248). The CPX server process responds by generating the appropriate host system file call to kernel manager 70 to close the host file. The kernel manager 70 passes the call to the kernel I/O services of block 66 which results in closing the host file. The CPX server process notifies DSH92 by enqueueing the IORB onto the MQI queue of DSH92 (i.e. block 248).

As indicated in FIG. 2*d*, in response to the IORB structure indicating that the session is complete, DSH92 returns the assigned RCT/TCB pair to the free queue. Then DSH92 kills the CPX server process (i.e. block 250).

From the above, it is seen how the CPX command enables copying of files between ES and host systems for a number of different file types in a highly secure manner.

APPENDICES

These Appendices include source listings which are subject to copyright protection. The copyright owner, Bull HN Information Systems Inc., has no objection to the facsimile reproduction by any one of the patent disclosure, as it appears in the Patent and Trademark Office patent files or records, but otherwise reserves all copyright rights in such listings whatsoever.

APPENDIX A - Dual Decor Components            Pages A-1 - A47
APPENDIX B - CPX Command Examples             Pages B-1 - B-2

APPENDIX A
DUAL DECOR COMPONENTS
*******************************************************************
Data Structure and Subroutines of Emulated System CPX Command Handler
*******************************************************************

```
/* table of file processing copy mode assignments.
 * logical record size and ci size are irrelevant so aren't specified.
 * the datacode is only meaningful in certain cases, otherwise it is
 * not specified.
 * in the table, DC_UNKNOWN means "don't check for file data_code setting",
 * and CP_UNKNOWN means "copy mode was not specified via the cmd line".
 * comparisons are made on a first-match basis.
 *
 * for now, the default copy mode will not be based on the data code.
 */ const CP_MODE_TABLE    cp_mode_table[] = {
  /* file_type         ctl arg    GCOS mode    Unix mode */

{ { F_SEQ   , 0, 0, DC_UNKNOWN }, CP_UNKNOWN, CP_BIN_BLK, CP_BIN_BLK },
  { { F_SEQ   , 0, 0, DC_UNKNOWN }, CP_ASCII  , CP_ASC_REC, CP_ASC_REC },
  { { F_SEQ   , 0, 0, DC_UNKNOWN }, CP_BINARY , CP_BIN_BLK, CP_BIN_BLK },
  { { F_SEQ   , 0, 0, DC_UNKNOWN }, CP_BIN_FLR, CP_BIN_REC_FLR, CP_BIN_REC_FLR },

{ { F_STREL , 0, 0, DC_UNKNOWN }, CP_UNKNOWN, CP_BIN_BLK, CP_BIN_BLK },
  { { F_STREL , 0, 0, DC_UNKNOWN }, CP_ASCII  , CP_ASC_REC, CP_ASC_REC },
  { { F_STREL , 0, 0, DC_UNKNOWN }, CP_BINARY , CP_BIN_BLK, CP_BIN_BLK },
  { { F_STREL , 0, 0, DC_UNKNOWN }, CP_BIN_FLR, CP_BIN_REC_FLR, CP_BIN_REC_FLR },

{ { F_FIXREL, 0, 0, DC_UNKNOWN }, CP_UNKNOWN, CP_BIN_BLK, CP_BIN_BLK },
  { { F_FIXREL, 0, 0, DC_UNKNOWN }, CP_ASCII  , CP_BIN_REC, CP_ASC_REC },
  { { F_FIXREL, 0, 0, DC_UNKNOWN }, CP_BINARY , CP_BIN_BLK, CP_BIN_BLK },
  { { F_FIXREL, 0, 0, DC_UNKNOWN }, CP_BIN_FLR, CP_BIN_REC_FLR, CP_BIN_REC_FLR },

{ { F_IND   , 0, 0, DC_UNKNOWN }, CP_UNKNOWN, CP_BIN_REC_SZ, CP_BIN_REC_SZ },
  { { F_IND   , 0, 0, DC_UNKNOWN }, CP_ASCII  , CP_ASC_REC   , CP_ASC_REC    },
  { { F_IND   , 0, 0, DC_UNKNOWN }, CP_BINARY , CP_BIN_REC_SZ, CP_BIN_REC_SZ },
  { { F_IND   , 0, 0, DC_UNKNOWN }, CP_BIN_FLR, CP_BIN_REC_FLR, CP_BIN_REC_FLR },

{ { F_REL   , 0, 0, DC_UNKNOWN }, CP_UNKNOWN, CP_BIN_BLK, CP_BIN_BLK },
  { { F_REL   , 0, 0, DC_UNKNOWN }, CP_ASCII  , CP_BIN_REC, CP_ASC_REC },
  { { F_REL   , 0, 0, DC_UNKNOWN }, CP_BINARY , CP_BIN_BLK, CP_BIN_BLK },
  { { F_REL   , 0, 0, DC_UNKNOWN }, CP_BIN_FLR, CP_BIN_REC_FLR, CP_BIN_REC_FLR },

{ { F_DYN   , 0, 0, DC_UNKNOWN }, CP_UNKNOWN, CP_BIN_BLK, CP_BIN_BLK },
  { { F_DYN   , 0, 0, DC_UNKNOWN }, CP_ASCII  , CP_BIN_REC, CP_ASC_REC },
  { { F_DYN   , 0, 0, DC_UNKNOWN }, CP_BINARY , CP_BIN_BLK, CP_BIN_BLK },
  { { F_DYN   , 0, 0, DC_UNKNOWN }, CP_BIN_FLR, CP_BIN_REC_FLR, CP_BIN_REC_FLR },

{ { F_CALC  , 0, 0, DC_UNKNOWN }, CP_UNKNOWN, CP_BIN_BLK, CP_BIN_BLK },
  { { F_CALC  , 0, 0, DC_UNKNOWN }, CP_ASCII  , CP_BIN_REC, CP_ASC_REC },
  { { F_CALC  , 0, 0, DC_UNKNOWN }, CP_BINARY , CP_BIN_BLK, CP_BIN_BLK },
  { { F_CALC  , 0, 0, DC_UNKNOWN }, CP_BIN_FLR, CP_BIN_REC_FLR, CP_BIN_REC_FLR },
```

```
{ { F_IDS2 , 0, 0, DC_UNKNOWN }, CP_UNKNOWN, CP_BIN_BLK, CP_BIN_BLK },
{ { F_IDS2 , 0, 0, DC_UNKNOWN }, CP_BINARY , CP_BIN_BLK, CP_BIN_BLK },
{ { F_IDS2 , 0, 0, DC_UNKNOWN }, CP_BIN_FLR, CP_BIN_REC_FLR, CP_BIN_REC_FLR },

{ { 0    , 0, 0, 0       }, CP_UNKNOWN, CP_UNKNOWN, CP_UNKNOWN }
};

/******************************************************************************/ int copy_file (FILE_INFO *file_list, CP_DIRECTION direction, long progress,
               int *copy_complete, long *num_units, long *num_bytes)
{
  COPY_MODE   copy_mode;
  int         rec_size, blk_size, buf_size, index_count;
  int         i, rc, rc2, rc3, rc4;
  size_t      mem_blk_size;
  long        prog_rem;   /* used for -progress arg byte counting */
  long        prog_dots;
  int         leftover;
  char *      leftover_p;
  char **     index_list;
  char *      buffer;
  FILE_INFO * from      = &file_list[SRC_FILE];
  FILE_INFO * to        = &file_list[DST_FILE];
  FILE_INFO * clone     = &file_list[CLONE_FILE];
  int         bytes_read    = 0;
  int         bytes_written = 0;
  long        n_units       = 0;
  long        n_bytes       = 0;
  long        unprintable   = 0;
  int         svr_lrn       = -1;
  int         complete      = FALSE;  /* set if file copy completes ok */

/* gain access to CPX file server */ rc = rc2 = rc3 = rc4 = 0;  /* initialize return codes */
  if (rc = op_cpx_svr (&svr_lrn))
    goto cleanup;
  else {
    /* the server has been reserved, and must eventually be disconnected
     * to release the reservation.  store the server lrn in the file info
     * structures for later reference.
     */
    switch (direction) {
        case TO_HOST:  file_list[DST_FILE].svr_lrn = svr_lrn;  break;
        case TO_GCOS:  file_list[SRC_FILE].svr_lrn = svr_lrn;  break;
    }
  }

/* allocate memory buffer.
```

```
 * we can do buffered or non-buffered i/o (i.e., we can pack/unpack
 * multiple records/blocks into a single transfer).
 * while non-buffered i/o may be simpler, buffered i/o is much faster
 * due to the overhead involved in a server request and disk driver
 * requests.
 */

/* --> note:
 * in ascii mode, if the size of the record read is exactly the same as
 * the buffer size, that may be okay as long as it is immediately followed
 * by a delimiter. we can avoid this problem by supplying a read buffer
 * that is always larger than the record size and testing the size limits
 * internally...  (or else the server could do look-ahead, yuck)
 */ rec_size   = (direction == TO_HOST) ? from->attrs.rec_size
                                      : to->attrs.rec_size;
  blk_size   = (direction == TO_HOST) ? from->attrs.ci_size
                                      : to->attrs.ci_size;
  i          = (direction == TO_HOST) ? DST_FILE : SRC_FILE;
  copy_mode  = file_list[i].copy_mode;

#if 0
/* --> for now, do buffering based on the environmental variable */
  buf_size = ((buf_size = get_var (ENV_BUFFER)) <= 0) ? blk_size : buf_size;
#endif
  buf_size = (IO_BUF_SZ / blk_size) * blk_size;  /* round down to block size */ if 0
  buf_size = (copy_mode & CP_RECORD) ?
             (rec_size + ((copy_mode & CP_ASCII) ? 1 : 0)) : buf_size;
endif /* allocate extra space at the end of the buffer.
   * leave room for 1 full extra record + a delimiter.
   */ mem_blk_size = ((size_t) buf_size) + ((size_t) rec_size) + 1;

if (DIAGNOSTICS (DIAG_CALLS)) {
    prt_msg (MSG116, diag_file, 0, 0, 1, buf_size);
    prt_msg (MSG117, diag_file, 0, 0, 1, mem_blk_size);
  } if ((buffer = (char *) malloc (mem_blk_size)) == NULL) {
    rc = prt_msg (MSG9, stdout, m4_errno, m4_errno, 0);
    goto cleanup;
  }

/* open input file */ rc = (direction == TO_HOST) ? op_gcos_file (from, buf_size)
                              : op_HOST_file (from);
```

```
if (rc != 0) {
   prt_msg (MSG28, stdout, rc, rc, 2, from->pathname, rc);
   goto cleanup;
}
else if (DIAGNOSTICS (DIAG_CALLS))
   prt_msg (MSG109, diag_file, 0, 0, 1, from->pathname);

/* open output file
 * if target file doesn't exist or needs to be re-created with different
 * new attributes (due to -clone or -f_r, -seq, etc.), now's the time to
 * do it.
 * if the output file already exists, and we haven't been told explicitly
 * what its attributes should be, just use what's already there.
 */ if (direction == TO_GCOS) {
   if (!to->exists || (to->exists && to->create_opts != CR_UNKNOWN)) {
         /* create the output file. if there is an existing file of the same
          * name, don't bother checking if the attributes are the same -
          * just delete it and recreate it with the desired attributes.
          */ if (to->exists) {
            if (rc = unlink (to->pathname) ? m4_errno : 0) {
               prt_msg (MSG27, stdout, rc, rc, 2, to->pathname, rc);
               goto cleanup;
            }
         }

/* create the output file */ if (rc = cr_gcos_file (to, clone)) {
            clone->exists ? prt_msg (MSG13, stdout, rc, rc,
                                     2, clone->pathname, rc)
                          : prt_msg (MSG24, stdout, rc, rc,
                                     2, to->pathname, rc);
            goto cleanup;
         }
   }
} rc = (direction == TO_HOST) ? op_HOST_file (to) : op_gcos_file (to, buf_size);
if (rc != 0) {
   prt_msg (MSG17, stdout, rc, rc, 2, to->pathname, rc);
   goto cleanup;
}
else if (DIAGNOSTICS (DIAG_CALLS))
   prt_msg (MSG110, diag_file, 0, 0, 1, to->pathname);

/* issue warning messages if accessing GCOS file via an index
 * or when reading/writing a GCOS file that has alternate indexes.
 */
```

```
        if ((rc = chk_indexes (direction == TO_HOST ? from : to, direction)) != 0)
            goto cleanup;

/* copy the input file to the output file. */
        /* -> keep a count of records when processing text files...
         */ for (leftover = prog_rem = 0; ; n_units++, n_bytes += bytes_written) {
            /* read from input file */
#if    0
            rc = (direction == TO_HOST) ?
                    rd_gcos_file (from, buffer, buf_size, &bytes_read) :
                    rd_HOST_file (from, buffer, buf_size, &bytes_read);
#endif
            rc = fill_buffer (from, direction, buffer, buf_size,
                              &bytes_read, &leftover, &leftover_p);

if (rc == M4_EOF)
                break;
            else if (rc != 0) {
                prt_msg (MSG15, stdout, (direction == TO_HOST ? rc : 0), rc,
                         2, from->pathname, rc);
                goto cleanup;
            }
            else if (DIAGNOSTICS (DIAG_ARGS))
                prt_msg (MSG107, diag_file, 0, 0, 1, bytes_read);

#if    0
            /* analyze the data buffer for unprintable characters when copying
             * in ascii mode. for now, only do this in diagnostic mode to avoid
             * overhead, since it's not clear if this is useful or not.
             * note: in buffered mode, the data buffer contains record delimiters
             * (newlines). these should not be counted when checking for
             * unprintable characters.
             */ if (DIAGNOSTICS (DIAG_CALLS) && (copy_mode & CP_ASCII))
                unprintable += chk_buf (buffer, bytes_read);
endif /* write to output file */ if    0
            rc = (direction == TO_HOST) ?
                    wr_HOST_file (to, buffer, bytes_read, &bytes_written) :
                    wr_gcos_file (to, buffer, bytes_read, &bytes_written);
#endif
            rc = flush_buffer (to, direction, buffer, buf_size, bytes_read,
                               &bytes_written, &leftover_p);

if (rc != 0) {
                prt_msg (MSG14, stdout, (direction == TO_HOST ? 0 : rc), rc,
```

```
                    2, to->pathname, rc);
                goto cleanup;
        }
        else if (DIAGNOSTICS (DIAG_ARGS))
                prt_msg (MSG108, diag_file, 0, 0, 1, bytes_written);

/* if -progress specified, issue a dot for every N bytes written.
         * (note: this will really slow things down!)
         */ if (progress > 0) {
                prog_dots = (bytes_written + prog_rem) / progress;
                prog_rem  = (bytes_written + prog_rem) % progress;
                while (prog_dots-- > 0)
                    m4putchar ('.');
        }

/* handle any leftover on the next time around */ if (bytes_read > bytes_written)
                leftover = bytes_read - bytes_written;
} rc = (rc == M4_EOF) ? 0 : rc;   /* EOF on input file is ok */

/* perform cleanup activities.
 * close the input and output files, return memory,
 * and release the server.
 */ if (progress > 0 && (n_bytes / progress) > 0)
        m4putchar ('\n');   /* force a newline if printing dots */ shrink_output_file:
    /* shrink the GCOS output file, ignore any error.
     * if the file already exists or another file is being cloned,
     * the odds are good that the data copied may require less space
     * than the current allocation (i.e., disk space may be wasted).
     * by doing a shrink, we release the extra allocation.
     */ if (direction == TO_GCOS) {
       rc2 = shr_gcos_file (to);
       if (DIAGNOSTICS (DIAG_CALLS))
            prt_msg (MSG113, diag_file, 0, 0, 2, to->pathname, rc2);
    } cleanup:
    rc = copy_clean (rc, file_list, buffer, &complete);
    *copy_complete = complete;
    *num_units     = n_units;
    *num_bytes     = n_bytes;
``` issue_warning:
    /* issue warning about unprintable characters when copying in ascii mode.
    * for now, only monitor this condition and report messages when running
    * in diagnostic mode until we decide if this is useful or not.
    * for now, issue a message if there are any unprintable characters,
    * and a severe warning if there are more than there are total records
    * or blocks. also print the total count.
    */ if (rc == 0 && copy_complete && (copy_mode & CP_ASCII)) {
        if ((unprintable >> 1) >= n_units || (unprintable >= (n_bytes >> 2))) {
            prt_msg (MSG60, stdout, 0, 0, 0);    /* lots of unprintable chars */
            prt_msg (MSG80, stdout, 0, 0, 1, unprintable);   /* print how many */
        }
        else if (unprintable)
            prt_msg (MSG61, stdout, 0, 0, 1, unprintable);   /* only a few?   */
    } return_status:
    return rc;

} /* copy_file() */
/***************************************************************************

/* to read from HOST, just do a read with supplied buffer size
 * to read from GCOS, it depends on the mode:
    CP_ASC_REC:  call fgetc() to read bytes up to EOF or buffer full
                 actually, we'll just call rd_gcos_file() to retrieve
                 a record at a time, which we'll then copy into the target
                 buffer. we'll have to insert newline characters as we go.
    CP_BIN_REC, CP_BIN_REC_FLR:
                 call getr() to read a record, copy it into the buffer,
                 repeat until buffer full. requires a local buffer to
                 hold partial records that don't fit completely into the
                 target buffer.
                 actually, we'll just call rd_gcos_file() to retrieve
                 a record at a time, which we'll then copy into the target
                 buffer.
                 after the records are in the buffer, we don't know how big
                 they are, but that's okay. if we care, use CP_BIN_REC_SZ mode
                 or else make use of a record_size option on the -FLR arg.
    CP_BIN_REC_SZ: same as above, but insert record size into the buffer
                 buffer in front of each record.
                 special requirement: there must be room for the full record
                 size value, i.e., can't split it across reads (or can we?).
                 (the record size field is 2 bytes.)
    CP_BIN_BLK:  call smread() to read a buffer's worth of bytes actually, we'll just call rd_gcos_file() to retrieve the data, directly
    into the target buffer.

* assumptions:
 *     when reading a GCOS file in record mode, the data buffer contains
 *     enough extra space at the end to hold a full record. this space

```
 *      is not described by the buffer size argument.
 *      the max advertised buffer size is 32KB-1, although it may actually
 *      contain more than that in the "hidden" space at the end.
 */ int fill_buffer (FILE_INFO *file, CP_DIRECTION direction, char *buffer,
                 int buf_size, int *bytes_read, int *leftover,
                 char **leftover_p)
{
  int       rc;
  int       n_bytes;
  int       avail      = buf_size - *leftover;
  char *    buf_p      = buffer + *leftover;
  COPY_MODE copy_mode  = file->copy_mode;

/* copy any leftover to the front of the buffer and reduce the
   * read range by the amount copied.
   */ if (*leftover > 0) {
    memcpy ((void *) buffer, (void *) *leftover_p, *leftover);
    if (DIAGNOSTICS (DIAG_ARGS)) {
        prt_msg (MSG125, diag_file, 0, 0, 1, *leftover);
        dmp_buf (diag_file, 3, buffer, *leftover);
    }
  } if (direction == TO_GCOS) {
    rc = rd_HOST_file (file, buf_p, avail, &n_bytes);
    *bytes_read = n_bytes + *leftover;
    *leftover   = 0;
  }
  else if (copy_mode == CP_BIN_BLK) {
    rc = rd_gcos_file (file, buf_p, avail, &n_bytes);
    *bytes_read = n_bytes + *leftover;
    *leftover   = 0;
  }
  else {
    /* reading records from GCOS, need to fill up the buffer as we go...
     * the 'bytes_read' count returned will reflect the amount of data
     * returned on the call, which may include some leftover amount from
     * the previous call, but not any leftover generated on this call.
     */ for (rc = n_bytes = 0; rc == 0 && avail > 0;
         buf_p += n_bytes, avail -= n_bytes) {
      if (copy_mode == CP_BIN_REC_SZ)
        buf_p += sizeof (int);   /* leave room for record size field */ rc = rd_gcos_file (file, buf_p, file->attrs.rec_size, &n_bytes);

/* insert record size or record delimiter into the output buffer.
       * include this in the buffer size calculations.
       */
```

```
            if (rc == 0) {
                switch (copy_mode) {
                    case CP_ASC_REC:
                        buf_p[n_bytes++] = '\n';
                        break;
                    case CP_BIN_REC_SZ:
                        buf_p -= sizeof (int);    /* reset buffer pointer */
                        memcpy ((void *) buf_p, (void *) &n_bytes, sizeof (int));
                        n_bytes += sizeof (int);
                        break;
                    default:
                        break;    /* add nothing, take nothing away */
                }
            }
        }

*leftover   = (avail >= 0) ? 0 : -avail;
        *leftover_p = (avail >= 0) ? (char *) NULL : (buffer + buf_size);
        *bytes_read = (avail >= 0) ? (buf_size - avail) : buf_size;
    } rc = (rc == M4_EOF && *bytes_read > 0) ? 0 : rc;
    return rc;

}  /* fill_buffer() */

/*
    to write to HOST, just write the requested number of bytes.
    to write to GCOS, it depends on the mode:
    CP_ASC_REC:  call fputc() to write bytes
                    (keep track of # of records processed here, instead of when
                    reading?)
    CP_BIN_REC, CP_BIN_REC_FLR:
                    call putr() to write a record of the specified record size,
                    copy it from the buffer, repeat until buffer empty.
                    unlikely to be useful except for fixed-length record files.
    CP_BIN_REC_SZ: same as above, but determine the record size by the rec size
                    field in front of each record.
                    do we have to worry about partial records? hmm...
    CP_BIN_BLK:  call smwrite() to write a buffer's worth of bytes actually, we'll just call rd_gcos_file() to retrieve the data, directly
    into the target buffer.
*/ int flush_buffer (FILE_INFO *file, CP_DIRECTION direction, char *buffer,
                    int buf_size, int wrt_size, int *bytes_written,
                    char **leftover_p)
{
    int     rc;
    int     n_bytes;
    int     amt_written;
```

```
int     n_records;
int     rec_size;
int     remain;
int     partial;
char *  s;
char *  buf_p;
COPY_MODE   copy_mode = file->copy_mode;

if (direction == TO_HOST)
    rc = wr_HOST_file (file, buffer, wrt_size, bytes_written);
else if (copy_mode == CP_BIN_BLK)
    rc = wr_gcos_file (file, buffer, wrt_size, bytes_written);
else {
    /* we have to extract the records from the buffer and write
     * them to the output file. keep track of how many we write.
     * there may be any number of records in the buffer, the last one
     * may be a partial record, and we may have leftover each time around.
     * each time around, the leftover must be stuffed at the front of the
     * read buffer so it will get included the next time.
     */ for (rc = n_records = n_bytes = 0, buf_p = buffer, remain = wrt_size;
            remain > 0; n_records++, buf_p += n_bytes, remain -= n_bytes) {
        /* determine the size of the record to be written */ switch (copy_mode) {
          case CP_ASC_REC:
                s       = (char *) memchr ((void *) buf_p, '\n', remain);
                rec_size = (s == NULL) ? remain : (s - buf_p);
                partial = (s == NULL) ? TRUE : FALSE;
                n_bytes = rec_size + (s == NULL ? 0 : 1);
                break;
          case CP_BIN_REC:
          case CP_BIN_REC_FLR:
                rec_size = n_bytes = file->attrs.rec_size;
                partial = (n_bytes > remain) ? TRUE : FALSE;
                break;
          case CP_BIN_REC_SZ:
                /* if not room in remainder of buffer for the record size
                 * field, or not room for the record data, but things can
                 * potentially be resolved by reading more data, consider
                 * the remaining stuff to be leftover for next time.
                 * also detect various out-of-range errors.
                 */ if (remain < sizeof (int))
                    partial = TRUE;
                else {
                    /* rec_size = *((int *) buf_p); */
                    rec_size = ((*buf_p) << 8) | *((unsigned char *) (buf_p+1));
                    n_bytes = rec_size + sizeof (int);
                    partial = (n_bytes > remain) ? TRUE : FALSE;
                }
```

```
                    break;
        }

/* validate the record size and write the record to the file */ if (DIAGNOSTICS (DIAG_ARGS))
            ml_dsp (MSG126, FALSE, diag_file, 0, (long *) NULL, 4,
                    n_records, rec_size, remain, partial);

if (partial && wrt_size == buf_size)
            break;    /* leave the partial record as leftover for next time */
        else if (partial && copy_mode == CP_BIN_REC_SZ)
            rc = REC_LEN_ERR;   /* don't write partial records in this case */
        else if (rec_size < 0 || rec_size > file->attrs.rec_size ||
                 rec_size > buf_size)
            rc = REC_LEN_ERR;   /* bogus record size */
        else
            rc = wr_gcos_file (file, buf_p +
                               (copy_mode == CP_BIN_REC_SZ ? sizeof (int) : 0),
                               rec_size, &amt_written);

if (rc != 0)
            break;    /* exit the loop, don't update statistics */
    }

*bytes_written = wrt_size - remain;
    *leftover_p = (remain > 0) ? buf_p : (char *) NULL;
} return rc;

} /* flush_buffer() */

/***************************************************************************/
/* issue i/o request to CPX server */ int issue_cpx_io (EXT_IORB *iorb_p, IORB_FN fcode, int lrn,
                  char *adr, int rng, unsigned int dvs)
{
    struct mcl_psb    regs;
    int               rc, rc2;

/* initialize IORB fields */ memset ((void *) iorb_p, 0, sizeof (EXT_IORB));
    iorb_p->i_ct1.s.i       = TRUE;           /* set for iorb request      */
    iorb_p->i_ct2.s.function = fcode;         /* set iorb function code    */
    iorb_p->i_ct2.s.extended = TRUE;          /* always use extended iorb  */
    iorb_p->i_ext           = 0x0D0D;         /* size of extended part     */
    iorb_p->i_ct2.s.lrn     = USE_XTND_LRN;   /* use extended LRNs         */
    iorb_p->i_elrn          = lrn;            /* store LRN in iorb         */
    iorb_p->i_adr           = CPTR_BASE (adr); /* set buffer address       */
    iorb_p->i_ct2.s.byte    = CPTR_OFFSET (adr) ? TRUE : FALSE;
    iorb_p->i_rng           = (short int) rng; /* set transfer range       */
```

```
  iorb_p->i_dvs    = dvs;         /* set device specific word */
  iorb_p->i_type   = CPX_IORB_ID; /* set iorb type for server */

/* set up mcl interface and issue request */ if OLD
  memset ((void *) ®s, 0, sizeof (struct mcl_psb));
  regs.reg_b4 = (short int *) &iorb_p->iorb_base;
  rc = mcl (MCL$RQIO, ®s);
  if (DIAGNOSTICS (DIAG_IORBS))
     dmp_iorb (diag_file, iorb_p);
  rc2 = iorb_p->i_dv2;  /* extract return code from iorb */ return rc ? (rc2 >= 0x0100 ? rc2 : rc) : rc;
endif memset ((void *) ®s, 0, sizeof (struct mcl_psb));
  regs.reg_b4 = (short int *) &iorb_p->iorb_base;
  if (DIAGNOSTICS (DIAG_IORBS))
     dmp_iorb (diag_file, iorb_p, "before ");
  rc = mcl (MCL$RQIO, ®s);
  if (DIAGNOSTICS (DIAG_IORBS))
     dmp_iorb (diag_file, iorb_p, "after ");
  rc2 = iorb_p->i_dv2;  /* extract return code from iorb */ return (rc == 0 && rc2 == 0) ? 0 : (rc2 ? rc2 : rc);

}   /* issue_cpx_io() */

/****************************************************************************/

/* reserve an available CPX server
 * 0810: monitor call code invalid, functionality must be present, enabled,
 *       and CPX directive must be specified in config file, and enough CPX
 *       servers must be configured
 * 083A: priv violation, cmd must be named 'CPX'
 */
int  op_cpx_svr (int *lrn)
{
#if   SIMULATION
  *lrn = 1;
  return 0;
#else
  int         rc;
  struct mcl_psb    regs;

memset ((void *) ®s, 0, sizeof (struct mcl_psb));
  if ((rc = mcl (MCL_CPX_LRN, ®s)) == 0) {
     *lrn = regs.reg_r2;
     if (rc = mcl (MCL_GTDEV, ®s))
        prt_msg (MSG22, stdout, rc, rc, 1, *lrn);
  }
  else
     prt_msg (MSG23, stdout, rc, rc, 0);
```

```
   return rc;
endif
}  /* op_cpx_svr() */

/****************************************************************************/

/* read from HOST file in either ascii or binary mode.
 * in ascii mode, we expect a complete text record will be able to fit
 * in the supplied buffer. if it won't, a record length error is returned.
 * record delimeters are not returned in the buffer or included in the
 * byte count. a trailing null byte is appended to the record if possible,
 * but this is not guaranteed or required to fit.
 * in binary mode, a block of the specified size is read, no record
 * translation occurs.
 * --> note: buffer must be word-aligned. (set ...i_ct2.s.byte if not)
 */ int rd_HOST_file (FILE_INFO *file, char *buffer, int buf_size, int *bytes_read)
{
#if   SIMULATION
   int     c, count, rc, rec_size;
   char *  s;
   char    rec_hdr[10];

switch (file->copy_mode) {
     case CP_ASC_REC:  /* read one text record from the file into the buffer */
                       for (count = 0, s = buffer; count <= buf_size; count++) {
                          if ((c = getc (file->fp)) == EOF) {
                             *bytes_read = count;
                             return M4_EOF;  /* non-delimited record */
                          }
                          else if (c == '\n') {
                             if (count < buf_size)
                                *s++ = '\0';  /* if room, tack on null */
                             *bytes_read = count;
/*--> what if we read more than record size?
 * here, we may have been supplied with a buffer larger than the file
 * record size, and we want to know if we've read too much to fit in a record.
 * however, here, we don't know the attributes of the target file, so maybe
 * we should just accept stuff, pass it on to the write routine, and let
 * IT fail when it checks the buffer size against the file record size...
 */
                             return 0;
                          }
                          else if (count >= buf_size)
                             break;
                          else
                             *s++ = c;
                       }
                       return REC_LEN_ERR;  /* record too large for buffer */
                       break;
     case CP_BIN_REC_SZ:
                       /* obtain the record size, then the data */
```

```c
                        *bytes_read = 0;
                        rc = fread (buffer, 1, sizeof (int), file->fp);
                        rc = (rc == 0) ? m4_errno : 0;
                        rc = (rc == M4_BLK_EOF) ? M4_EOF : rc;
                        if (rc != 0)
                           return rc;
                        else if ((rec_size = *((int *) buffer)) > buf_size)
                           return REC_LEN_ERR;
                        else
                           buf_size = rec_size;
                        /* fall through */
        case CP_BIN_REC:
        case CP_BIN_REC_FLR:
        case CP_BIN_BLK:  /* read block of bytes from the file into the buffer */
                        rc = fread (buffer, 1, buf_size, file->fp);
                        *bytes_read = rc;
                        rc = (rc == 0 && buf_size != 0) ? m4_errno : 0;
                        rc = (rc == M4_BLK_EOF) ? M4_EOF : rc;
                        if (rc == 0 && *bytes_read < buf_size &&
                            file->copy_mode == CP_BIN_REC_SZ)
                           rc = REC_LEN_ERR;
                        return rc;
                        break;
   }
else
   int         rc, rec_size;
   EXT_IORB    iorb;
   COPY_MODE   copy_mode = file->copy_mode;
   char        rec_hdr[10];

/* read record header if necessary */ if (copy_mode == CP_BIN_REC_SZ) {
      memset ((void *) rec_hdr, 0, sizeof (int));
      *bytes_read = 0;
      rc = issue_cpx_io (&iorb, FN_READ, file->svr_lrn,
                         rec_hdr, sizeof (int), 0);
      if (rc != 0)
         return M4_EOF;   /* translate error code */
      else if ((rec_size = *((int *) rec_hdr)) > buf_size || rec_size < 0)
         return REC_LEN_ERR;

buf_size = rec_size;
   }

/* issue the read request.
    * if end of file reached, we assume we didn't get any data back (?).
    * partial read is considered an error (at least for now).
    */ rc = issue_cpx_io (&iorb, FN_READ, file->svr_lrn, buffer, buf_size, 0);
```

```
  if (rc != 0) {
    if (iorb.i_st & MI_EOF)
        rc = M4_EOF;   /* end of file detected */
  }

*bytes_read = buf_size - iorb.i_rsr;

if (rc == 0) {
    switch (copy_mode) {
        case CP_BIN_REC_SZ:  if (*bytes_read < buf_size)
                                rc = REC_LEN_ERR;
                             break;
        case CP_ASC_REC:     if (iorb.i_st & MI_PARTIAL)
                                rc = REC_LEN_ERR;
                             break;
    }
  } return rc;
endif
}  /* rd_HOST_file() */

/***************************************************************************/

/* write to HOST file in either ascii or binary mode.
 * in ascii mode, we expect a complete text record will be in the
 * supplied buffer. the buffer size specifies the size of the record
 * to be written, and does not include the record delimeter (if present
 * in the buffer). however, the record is considered to terminate with
 * either a null byte or a newline character, if they exist in the buffer.
 * if present, the null byte or newline is not considered to be part of the
 * record and is not included in the byte count that is written.
 * in binary mode, a block of the specified size is written, no record
 * translation occurs.
 * --> note: buffer must be word-aligned.
 */ int  wr_HOST_file (FILE_INFO *file, char *buffer, int buf_size,
                   int *bytes_written)
{
#if   SIMULATION
  unsigned int    c;
  unsigned char *  s;
  int             count, rc;
  char            rec_hdr[10];

switch (file->copy_mode) {
    case CP_ASC_REC:  /* write one text record from the buffer to the file */
                     for (count = rc = c = 0, s = (unsigned char *) buffer;
                          count <= buf_size; count++) {
                        c = (count == buf_size) ?
                            ((unsigned char) '\n') : *s++;
                        if (c == '\0' || c == '\n')
                            c = '\n';
```

```
                              putc ((char) c, file->fp);
                              if (ferror (file->fp)) {
                                  rc = m4_errno;
                                  break;
                              }
                              else if (c == '\n')
                                  break;
                          }
                          *bytes_written = count;
                          rc = rc ? rc :
                              ((*bytes_written != buf_size) ? REC_LEN_ERR : 0);
                          return rc;
                          break;
            case CP_BIN_REC_SZ:
                          /* write a 2-byte record size header, then write the
                           * record data to the file
                           */
                          *bytes_written = 0;
                          memcpy ((void *) rec_hdr, (void *) &buf_size,
                              sizeof (int));
                          rc = fwrite (rec_hdr, 1, sizeof (int), file->fp);
                          rc = (rc == 0) ? m4_errno : 0;
                          rc = (rc == M4_BLK_EOF) ? M4_EOF : rc;
                          if (rc != 0)
                              return rc;
                          /* fall through */
            case CP_BIN_REC:
            case CP_BIN_FLR:
            case CP_BIN_BLK: /* write block of bytes from the buffer to the file */
                          rc = fwrite (buffer, 1, buf_size, file->fp);
                          *bytes_written = rc;
                          rc = (rc == 0 && buf_size != 0) ? m4_errno : 0;
                          rc = (rc == M4_BLK_EOF) ? M4_EOF : rc;
                          return rc;
                          break;
    }
else
    int         rc;
    struct mcl_psb   regs;
    EXT_IORB         iorb;
    char             rec_hdr[10];

/* write record header if necessary */ if (file->copy_mode == CP_BIN_REC_SZ) {
        memcpy ((void *) rec_hdr, (void *) &buf_size, sizeof (int));
        *bytes_written  = 0;
        rc = issue_cpx_io (&iorb, FN_WRITE, file->svr_lrn,
                          rec_hdr, sizeof (int), 0);
        if (rc != 0)
            return M4_EOF;   /* translate error code */
    }
```

```c
/* write the record data.
 * if error, we may have written a partial record/block (do we care?).
 */ rc = issue_cpx_io (&iorb, FN_WRITE, file->svr_lrn,
                        buffer, buf_size, 0);
    if (rc != 0)
        rc = M4_EOF;   /* translate error code */

*bytes_written = buf_size - iorb.i_rsr;
    return rc;
endif
}   /* wr_HOST_file() */

/* write to GCOS file in either ascii or binary mode, using either
 * Data Management records or Storage Management blocks (CIs).
 * in record mode, we expect a complete record will be in the
 * supplied buffer. the buffer size specifies the size of the record
 * to be written, and does not include the record delimeter (if present
 * in the buffer). however, the record is considered to terminate with
 * either a null byte or a newline character, if they exist in the buffer.
 * if present, the null byte or newline is not considered to be part of the
 * record and is not included in the byte count that is written.
 * since the record size could be larger than the file record size, we'll
 * check this and report a record length error if so.
 *
 * issue: if we do buffering in ascii record mode, at least with
 * string-relative files, then maybe we'll want to allow multiple records
 * per buffer, with embedded newlines to mark the record boundaries.
 * in that case, we'll scan the buffer limit is reached, not just the
 * first newline (if any).
 *
 * in block mode, a block of the specified size is written, no record
 * translation occurs. the supplied buffer may contain multiple blocks.
 */ int  wr_gcos_file (FILE_INFO *file, char *buffer, int buf_size,
                    int *bytes_written)
{
    unsigned char *    s;
    unsigned int       c;
    int                count, rc;
    int                rec_size = file->attrs.rec_size;

switch (file->copy_mode) {
        case CP_ASC_REC:   /* write one text record from the buffer to the file */ if (buf_size > rec_size)
                return REC_LEN_ERR;   /* record too big for file */ for (count = rc = c = 0, s = (unsigned char *) buffer;
                count <= buf_size; count++) {
                c = (count == buf_size) ?
```

```
                                        ((unsigned char) '\n') : *s++;
#if    0
                                /* don't do this mapping? */
                                if (c == '\0' || c == '\n')
                                    c = '\n';
#endif
                                putc ((char) c, file->fp);
                                if (ferror (file->fp)) {
                                    rc = m4_errno;
                                    break;
                                }
                                else if (count == buf_size)
                                    break;
                            }
                            *bytes_written = count;
                            rc = rc ? rc :
                                ((*bytes_written != buf_size) ? REC_LEN_ERR : 0);
                            return rc;
                            break;

case CP_BIN_REC_SZ:
    case CP_BIN_REC_FLR:
    case CP_BIN_REC:    /* write one binary record from buffer into the file */
                            if (buf_size > rec_size)
                                return REC_LEN_ERR;    /* record too big for file */
                            rc = putr (WR_NXT, file->fd, buffer, buf_size, 0);
                            *bytes_written = (rc < 0) ? 0 : buf_size;
                            rc = (rc < 0) ? m4_errno : 0;
                            rc = rc ? rc :
                                ((*bytes_written != buf_size) ? REC_LEN_ERR : 0);
                            return rc;
                            break;

/* --> maybe pad short block writes up to the block size when writing
 * to a GCOS file with fixed-length records/blocks (maybe everything
 * except for S_R files?). (should only happen once, at the end).
 */
    case CP_BIN_BLK:    /* write block of bytes from the buffer to the file */ if    0
                            if (buf_size > rec_size)
                                return REC_LEN_ERR;    /* record too big for file */
#endif
                            rc = smwrite (file->fd, buffer, buf_size);
                            *bytes_written = (rc > 0) ? rc : 0;
                            rc = (rc < 0) ? m4_errno : ((rc == 0) ? M4_EOF : 0);
                            rc = (rc == M4_BLK_EOF) ? M4_EOF : rc;
                            rc = rc ? rc :
                                ((*bytes_written != buf_size) ? REC_LEN_ERR : 0);
                            return rc;
                            break;
    }

}   /* wr_gcos_file() */
```

```
/****************************************************************************
  Relevant Structures used by Host Server Processes
****************************************************************************/
struct TTBL
{
        struct LQHEAD   tq;     /* uses wtcb from connect as priority */
        unsigned short  cnt;    /* connect count */
        short           type;   /* server type (LK_FILE or LK_PIPE) */ struct MQI      tch;
        struct LQHEAD   flist;  /* queue of ftbl entries this ttbl */
};

union FD
{
        int     fdes;   /* file descriptors */
        FILE    *stream;
};

struct LRB
{
  struct neg_lrb
  {
        WORD    lk_lrx;    /* lrn extension (lrn in ct2 = FD) */
        ADDR    lk_rrb[2]; /* return rb (r=1)          */
  }       neg;
  ADDR    lk_rs[2];  /* return status      */
  WORD    lk_ct1;    /* rs    |t|w|u|s|a|r|d|1 */
  WORD    lk_ct2;    /* lrn   |i|b| |e| funct */
  ADDR    lk_adr[2]; /* buffer address (UCB adr. on connect) */
  WORD    lk_rng;    /* range            */
  WORD    lk_dvs;    /* device specific word  */
  WORD    lk_rsr;    /* residual range   */
  WORD    lk_st;     /* first status word    */
  WORD    lk_ext;    /* extended rb length   */

WORD    lk_fsfail;   /* 02xx failure code */
  WORD    lk_control;  /* control bits */
  WORD    lk_fcb[2];
  WORD    lk_ftbl[2];  /* elements RISC ftabl address */
  WORD    lk_seek[2];  /* byte offset for seek */
  ADDR    lk_pthp[2];  /* address of file/pipe name */
  WORD    lk_prng;     /* range of pthp */
  WORD    lk_type;     /* LK_PIPE | LK_FILE | LK_CPX */
  WORD    lk_iofail;   /* 01xx failure code */
  ADDR    lk_fib[2];   /* FIB address */
  WORD    lk_mclfc;    /* MCL function code */
};

struct FTBL
{
        struct LQHEAD   fq;
        ulong           tskadr;  /* TTBL entry for this file */
        union FD        fd;      /* file descriptors for binary & text files */
```

```
    int       status;
    ulong         current_rseek; /* offset of current record for read */
    ulong         current_wseek; /* offset of current record for write */
    ulong     current_rwseek; /* offset for rewrite */
    ulong     fcb;
    short     cdvs;
    short     type;
    char pathname[MAX_PATH_RANGE+1];
};
```

```
/*********************************************************************
 Code of Host Dynamic Server Handler(92)
**********************************************************************
*
struct sigaction  lnk_actions;
sigset_t          lnk_sigs;
struct MQI        *lnk_srvr;
struct LQHEAD     *ptr_dd_freeq;
extern void       srvrsegv();
extern struct LQHEAD *lnk_findq();
extern struct LQHEAD *lnk_dqh();
extern void
sigsak(), sigdanger1();

char          person[14];
int           mainpid, pid, signo, lrn, plog = 0;
unsigned int  fdkey, msgaddr;
char          *srvr_base();
struct TTBL   *qhdt, *tskadr;
struct FTBL   *qhdf, *ftbl;
struct USRTBL *qhdu;
struct LQHEAD *lptr, *lnkq_frm, *prev, *ftbl_head;
struct TCB    *tcb;
struct UCB    *ucb_ptr;

static union MATH math;
static char       func_code;
static char       *ptr;
static int        i;
static unsigned long ucb, priority;
FILE          *ipipe_stream, *opipe_stream;      /* dummies for linker */ define _FLNK  "hvx_file"
define S_FLNK "/bin/hvx_file"
#define _PLNK  "hvx_pipe"
#define S_PLNK "/bin/hvx_pipe"
#define _CPX   "hvx_cpx"
#define S_CPX  "/bin/hvx_cpx"
#define _XSH   "hvx_nxsh"
#define S_XSH  "/bin/hvx_nxsh"
#define _BSC   "hvx_bsc"
#define S_BSC  "/bin/hvx_bsc"
#define _ILNK  "hvx_isam"
#define S_ILNK "/bin/hvx_isam"

/* func_code deltas for specific servers - must be a multiple of 16 */
define BSC_DELTA 16 static char   tree[MAXPATHLEN + 15];
char          group_path[MAXPATHLEN + 1];
struct GCB    *gcb;
struct LRT    *lrt;
char          *lnk_table;
```

```
int        seq = 0;

/*******
 * main *
 *******/
void
main(argc, argv, envp)
int        argc;
char       *argv[];
char       *envp[];
{
    struct passwd   *pwent;
    struct IRB      *irb;
    struct RB       *iorb;

process = SERVER;
    openlog(get_session_name(), LOG_PID, LOG_LOCAL0);
    setlogmask(LOG_MASK(LOG_ERR)
            | LOG_MASK(LOG_WARNING)
            | LOG_MASK(LOG_NOTICE));
    if (parse_options(argc, argv) != 0)
    {
        syslog(LOG_ERR, "E588: LINK: Invalid command line options");
        exit(1);
    }
    close_fd();
    mainpid = getppid();
    if ((base = shmat(opt.shmid, (char *) NULL, 0)) == (char *) -1)
    {
        syslog(LOG_ERR, "E589: LINK: shmat: %m");
        exit(1);
    }
    init_vm();
    if (intrp_vm())
    {
        lnk_cleanup();
        exit(1);
    }
    srvr_vm();
    /* attach shared memory containing allow table */
    if ((Msg = (struct MSG *) shmat(msg_shmid, (char *) MSG_ADDR, 0))
            == (struct MSG *) - 1)
    {
        syslog(LOG_ERR, "E1146: LNK: shmat(): %m");
        lnk_cleanup();
        exit(1);
    }
    if ((unsigned int) Msg != msgaddr)
        syslog(LOG_ERR, "E1147: attached @ %x, should be %x", Msg, msgaddr);
    lnk_actions.sa_handler = lnk_handler;
    lnk_actions.sa_mask = lnk_sigs;
    lnk_actions.sa_flags = 0;
    for (signo = 0; signo < NSIG; signo++)
    {
```

```
            switch (signo)
            {
            case SIGUSR2:
                sigaction(signo, &lnk_actions, NULL);
                break;
            case SIGCHLD:
            case SIGABRT:
            case SIGTERM:
                sigset(signo, SIG_DFL);
                break;
            case SIGSOUND:
                init_rusage("DDECOR", lnk_srvr->isem.sid);
                break;
            case SIGSAK:
                sigset(SIGSAK, sigsak);
                break;
            case SIGDANGER:
                sigset(SIGDANGER, sigdanger1);
                break;
            case SIGSEGV:
                sigset(SIGSEGV, srvrsegv);
                break;
            default:
                sigset(signo, SIG_IGN);
                break;
            }
        }                              /* endloop */
        get_acl_qhead();
        lptr = (struct LQHEAD *) qhdu;
        syslog(LOG_NOTICE, "N062: USRTBL:        sid = %x", lptr->prio1);
        if (geteuid())
                syslog(LOG_ERR,
                    "E855: hvx_lnk not run as root: DDCOR functions disabled!");
        for (;;)
        {
                irb = (struct IRB *) mqi_dqh(lnk_srvr);
                SRVR_RISC_ADDR(iorb, (struct RB *), irb->i_rb, irb);
                iorb = (struct RB *) ((char *) iorb - OFF_RB);
/* do io */
                lnk_io(iorb, irb);
        }                              /* for */
}                                      /* main */

/**************
 * lnk_handler * signal handler
 **************/
void
lnk_handler(int sigtype)
{
   switch (sigtype)
   {
           case SIGUSR2:
           lnk_cleanup();
           break;
```

```
    }
}                              /* lnk_handler */
/****************
 * parse_options *
 ****************/
int
parse_options(int argc, char **argv)
{
    unsigned int    lnk_queue;
    int             o;
    extern char     *optarg;
    char            cbuff[10];

opt.private = TRUE;
    opt.rusage = FALSE;
    while ((o = getopt(argc, argv, "PrVva:b:u:f:i:l:q:s:t:g:w:D:")) != -1)
    {
        switch (o)
        {
        case 'D':
            sscanf(optarg, "%d", &plog);
            break;
        case 'a':
            sscanf(optarg, "%d", &msg_shmid);
            break;
        case 'b':
            sscanf(optarg, "%d", &msgaddr);
            break;
        case 'g':
            sscanf(optarg, "%s", &group_path);
            break;
        case 'P':
            opt.private = FALSE;
            break;
        case 'r':
            opt.rusage = TRUE;
            break;
        case 'V':
            hvx_verV(argv[0]);
            exit(0);
            break;
        case 'v':
            closelog();
            openlog(get_session_name(), LOG_PID, LOG_LOCAL0);
            setlogmask(LOG_MASK(LOG_ERR)
                    | LOG_MASK(LOG_WARNING)
                    | LOG_MASK(LOG_INFO)
                    | LOG_MASK(LOG_NOTICE)
                    | LOG_MASK(LOG_DEBUG));
            verbose = TRUE;
            break;
        case 's':
            sscanf(optarg, "%x", &opt.shmid);
```

```
                break;
        case 'f':
                sscanf(optarg, "%d", &fdkey);
                break;
        case 'l':
                sscanf(optarg, "%x", &lnk_queue);
                lrt = (struct LRT *) lnk_queue;
                break;
        case 'q':
                sscanf(optarg, "%x", &lnk_queue);
                lnk_srvr = (struct MQI *) lnk_queue;
                break;
        case 'u':
                sscanf(optarg, "%x", &lnk_queue);
                ptr_dd_freeq = (struct LQHEAD *) lnk_queue;
                break;
        case 't':
                sscanf(optarg, "%x", &lnk_queue);
                lnk_table = (char *) lnk_queue;
                qhdt = (struct TTBL *) lnk_table;
                qhdf = (struct FTBL *) (lnk_table + (sizeof(struct LQHEAD)));
                break;
        case 'w':
                sscanf(optarg, "%d", &virt_view);
                break;
        default:
                break;
        }                               /* switch */
    }                                   /* while */
    if (argc == 1)
        return (1);
    else
        return (0);
}                                       /* parse_options */

/*********
 * lnk_io *      Dual Decor server - execs all dynamic servers
 *********/
void
lnk_io(struct LRB * iorb, struct IRB * irb)
{
    struct RCT      *rct;
/*
 * control server process waits with mqi_dqh for ES requests
 * and requests for assistance from the task servers (iorb function code =
 * original+FUNC_DELTA)
 */
    lrn = (iorb->lk_ct2 >> 8);
    if (lrn == 0xfd)
        lrn = iorb->neg.lk_lrx;
    RISC_ADDR(rct, (struct RCT *), (lrt->rt_rct + lrn * 2));
    rct = (struct RCT *) ((char *) rct - OFF_RCT);
    if (rct->qaddr.internal_id == LNK_ID)
    {
```

```
            switch (iorb->lk_type)
            {
            case LK_FILE:
                rct->qaddr.internal_id = LINKF_ID;
                break;
            case LK_PIPE:
                rct->qaddr.internal_id = LINKP_ID;
                break;
            case LK_ISAM:
                if (allowed("cisam"))
                {
                        rct->qaddr.internal_id = LINKI_ID;
                }
                else
                {
                        ret_ddcor_rct(rct);
                        io_exit(rct, irb, ILLEGAL_FUNCTION_CODE);
                        return;
                }
                break;
            default:
                ret_ddcor_rct(rct);
                io_exit(rct, irb, ILLEGAL_FUNCTION_CODE);
                return;
                break;
            }                           /* switch */
      }
      func_code = iorb->lk_ct2 & l_fc;
      switch (rct->qaddr.internal_id)
      {
      case LINKP_ID:
            switch (func_code)
            {
            case CONN_FUNCTION:
            case CONN_FUNCTION + FUNC_DELTA:
            case DISC_FUNCTION:
            case DISC_FUNCTION + FUNC_DELTA:
            case BREAK_FUNCTION:
                break;
            default:
                ret_ddcor_rct(rct);
                io_exit(rct, irb, ILLEGAL_FUNCTION_CODE);
                return;
                break;
            }
            break;
      case LINKI_ID:
      case LINKF_ID:
            switch (func_code)
            {
            case CONN_FUNCTION:
            case CONN_FUNCTION + FUNC_DELTA:
            case DISC_FUNCTION:
            case DISC_FUNCTION + FUNC_DELTA:
```

```
            break;
        default:
            ret_ddcor_rct(rct);
            io_exit(rct, irb, ILLEGAL_FUNCTION_CODE);
            return;
            break;
        }
        break;
    case CPX_ID:
        switch (func_code)
        {
        case CONN_FUNCTION:
        case CONN_FUNCTION + FUNC_DELTA:
        case DISC_FUNCTION:
        case DISC_FUNCTION + FUNC_DELTA:
            break;
        default:
            ret_ddcor_rct(rct);
            io_exit(rct, irb, ILLEGAL_FUNCTION_CODE);
            return;
            break;
        }
        break;
    case NXSH_ID:
        switch (func_code)
        {
        case FC_SWITCH:
        case DISC_FUNCTION:
            break;
        default:
            ret_ddcor_rct(rct);
            io_exit(rct, irb, ILLEGAL_FUNCTION_CODE);
            return;
            break;
        }
        break;
/* bsc is not "dual decor" - there are no user checks - rcts are fixed */
    case BSC_ID:
        switch (func_code)
        {
        case CONN_FUNCTION:
        case DISC_FUNCTION:
            func_code += BSC_DELTA;
            break;
        default:
            io_exit(rct, irb, ILLEGAL_FUNCTION_CODE);
            return;
            break;
        }
        break;
    default:
        syslog(LOG_ERR, "E847: DDCOR Invalid internal_id=%d; lrn=%d",
            rct->qaddr.internal_id, lrn);
        if (rct->qaddr.internal_id != BSC_ID)
```

```
                ret_ddcor_rct(rct);
            io_exit(rct, irb, ILLEGAL_FUNCTION_CODE);
            return;
            break;
    }                           /* switch internal_id */
    switch (func_code)
    {
    case CONN_FUNCTION:
            iorb->lk_iofail = iorb->lk_fsfail = 0;
            RISC_ADDR(tcb, (struct TCB *), irb->i_tcb);
            tcb = (struct TCB *) ((char *) tcb - OFF_TCB);
            RISC_ADDR(ucb_ptr, (struct UCB *), tcb->t_ucbp);
            memcpy(person, &ucb_ptr->u_pid, 12);
            person[12] = '\0';
            if (ptr = (strchr(person, ' ')))
                *ptr = '\0';
            for (i = 0; i < strlen(person); i++)
            {
              if (isupper(person[i]))
                    person[i] = tolower(person[i]);
            }
            if ((geteuid()) || (!(get_user(irb, iorb, person))))
            {
                if (geteuid())
                {
                    syslog(LOG_ERR, "E856: hvx_lnk must run as root!");
                }
                iorb->lk_fsfail = ACCESS_CONTROL_VIOL;
                if (rct->qaddr.internal_id != CPX_ID)
                    ret_ddcor_rct(rct);
                io_exit(rct, irb, SUCCESS_CODE);
                return;
            }
            if ((!(iorb->lk_dvs & l_hu)) || (rct->qaddr.internal_id == CPX_ID))
    /* physical connect (lk_dvs bits different for CPX)*/
            {
                if (rct->qaddr.internal_id == CPX_ID)
                {
                    SRVR_RISC_ADDR(ptr, (char *), iorb->lk_adr, irb);
                }
                else
                {
                    if (iorb->lk_prng > MAX_PATH_RANGE)
                    {
                      iorb->lk_fsfail = LONG_PATH_ERROR;
                      ret_ddcor_rct(rct);
                      io_exit(rct, irb, SUCCESS_CODE);
                      break;
                    }
                    SRVR_RISC_ADDR(ptr, (char *), iorb->lk_pthp, irb);
                }
                if (ptr[0] != '/')
                {
                    iorb->lk_fsfail = ILLEGAL_PATHNAME;
```

```
                    if (rct->qaddr.internal_id != CPX_ID)
                    {
                       ret_ddcor_rct(rct);
                    }
                    io_exit(rct, irb, SUCCESS_CODE);
                    break;
            }
        }
        else
        {
           if (rct->qaddr.internal_id != CPX_ID)
           {
                   ret_ddcor_rct(rct);
           }
           io_exit(rct, irb, ILLEGAL_FUNCTION_CODE);
           break;
        }
/*
 * for pipes & CPX each connect execs a task server
 * for files the connect execs a task server for each unique UCB
 */
            SRVR_RISC_ADDR(ucb, (unsigned long), iorb->lk_adr, irb);
            switch (rct->qaddr.internal_id)
            {
            case LINKI_ID:
            case LINKF_ID:           /* is the waiting task UCB in ltable? */
               lnkq_frm = lnk_findq(qhdt, ucb, &prev);
               tskadr = (struct TTBL *) lnkq_frm;
               if ((lnkq_frm == 0) || (tskadr->type != rct->qaddr.internal_id))
               {
            case LINKP_ID:
                   lnkq_frm = lnk_dqh(qhdt, AVAIL_Q);
                   if (lnkq_frm == 0)
                   {
                      syslog(LOG_ERR, "E493: Logic error in lnk_io!");
                      io_exit(rct, irb, UNAVL_CODE);
                      break;
                   }
                   if (rct->qaddr.internal_id == LINKF_ID)
                      priority = ucb;
                   else
                      priority = (unsigned long) rct;
                   lnk_qoh(qhdt, lnkq_frm, priority);
                   tskadr = (struct TTBL *) lnkq_frm;
                   tskadr->type = rct->qaddr.internal_id;
                   init_mqi(&tskadr->tch, 0);       /* mqi address for task
                                                     * server */
                   tskadr->cnt = 0;  /* connect count for this task server */
                   exec_drvr(rct);
                   tskadr = (struct TTBL *) lnkq_frm;
                   if (pid < 0)
                   {
                      tskadr->tch.isem.pid = 0;
                      rtn_ttbl(iorb, rct, irb);
```

```
                io_exit(rct, irb, UNAVL_CODE);
                break;
            }
            tskadr->tch.isem.pid = pid;
/*          syslog(LOG_DEBUG, "Created pid %d for LRN %d", pid, lrn);*/
        }
        syslog(LOG_INFO, "I543: LNK Connect to LRN %d", lrn);
/*
 * at this point either a new task server has been exec'ed or the TTBL entry
 * for an existing task has been located. In both cases the TTBL entry is in
 * lnkq_frm. Now get a FTBL entry for this connect.
 */
        tskadr = (struct TTBL *) lnkq_frm;
        rct->qaddr.pid = (int) tskadr;
        lnkq_frm = lnk_dqh(qhdf, AVAIL_Q);
        if (lnkq_frm == NULL)
        {
            syslog(LOG_ERR, "E506: Logic error in lnk_io!");
            io_exit(rct, irb, UNAVL_CODE);
            break;
        }
/*
 * put FTBL element address (task id) in iorb for file system
 * fill in FTBL fields for task server
 * link FTBL entry to TTBL queue
 * queue irb to task server
 */
        ftbl = (struct FTBL *) lnkq_frm;
        ftbl_head = (struct LQHEAD *) (&tskadr->flist.prio1);
        lnk_qoh(ftbl_head, ftbl, (ulong) lnkq_frm);
        ftbl->tskadr = (ulong) tskadr;
        PUT4(iorb->lk_ftbl, (ulong) lnkq_frm);
        ftbl->cdvs = iorb->lk_dvs;
        ftbl->type = rct->qaddr.internal_id;
        GET4(ftbl->fcb, iorb->lk_fcb);
        ftbl->status = ftbl->current_rseek =
            ftbl->current_wseek = ftbl->current_rwseek = 0;
        SRVR_RISC_ADDR(ptr, (char *), iorb->lk_pthp, irb);
        memcpy(ftbl->pathname, ptr, iorb->lk_prng);
        ftbl->pathname[iorb->lk_prng] = '\0';
        mqi_qot(&tskadr->tch, irb);
        break;
    case CPX_ID:
        init_mqi(&rct->qaddr, 0);        /* mqi address for task server */
        syslog(LOG_INFO, "I573: CPX Connect to LRN %d", lrn);
        exec_drvr(rct);
        rct->qaddr.isem.pid = pid;
        mqi_qot(&rct->qaddr, irb);
        break;
    default:            /* not LK_PIPE, LK_FILE */
        io_exit(rct, irb, ILLEGAL_FUNCTION_CODE);
        break;
    }                   /* lk type switch */
    break;
```

```
case CONN_FUNCTION + FUNC_DELTA:        /* error from child process */
    iorb->lk_ct2 -= FUNC_DELTA;
    rct->qaddr.pid = 0;
    rtn_ttbl(iorb, rct, irb);
    io_exit(rct, irb, iorb->lk_iofail);
    break;
case CONN_FUNCTION + BSC_DELTA:
    init_mqi(&rct->qaddr, 0);  /* mqi address for task server */
    syslog(LOG_INFO, "I621: BSC Connect to LRN %d", lrn);
    exec_drvr(rct);
    rct->qaddr.isem.pid = pid;
    mqi_qot(&rct->qaddr, irb);
    break;
case DISC_FUNCTION + FUNC_DELTA:
    iorb->lk_ct2 -= FUNC_DELTA;
case DISC_FUNCTION:
case DISC_FUNCTION + BSC_DELTA:
    rct->qaddr.pid = 0;
    switch (rct->qaddr.internal_id)
    {
    case LINKI_ID:
    case LINKF_ID:
    case LINKP_ID:
        if (iorb->lk_iofail == SUCCESS_CODE)
            rtn_ttbl(iorb, rct, irb);
        break;
    case NXSH_ID:
        syslog(LOG_INFO, "I574: NXSH disconnect LRN %d", lrn);
        hvx_clnp1a(&rct->qaddr.isem.pid, 0);
        ret_ddcor_rct(rct);
        break;
    case CPX_ID:
        syslog(LOG_INFO, "I575: CPX disconnect LRN %d", lrn);
        hvx_clnp1a(&rct->qaddr.isem.pid, 0);
        ret_ddcor_rct(rct);
        break;
    case BSC_ID:
        syslog(LOG_INFO, "I622: BSC disconnect LRN %d", lrn);
        hvx_clnp1a(&rct->qaddr.isem.pid, 0);
        break;
    }
    io_exit(rct, irb, iorb->lk_iofail);
    break;
case BREAK_FUNCTION:
    iorb->lk_iofail = iorb->lk_fsfail = 0;
    GET4(math.adrs, iorb->lk_ftbl);
    lnkq_frm = (struct LQHEAD *) math.ptr;
    ftbl = (struct FTBL *) lnkq_frm;
    GET4(math.adrs, iorb->lk_ftbl);
    if (lnkq_frm->prio1 != math.adrs)
    {
        io_exit(rct, irb, ILLEGAL_FUNCTION_CODE);  /* illegal task id */
        break;
    }
```

```
                kill(tskadr->tch.isem.pid, SIGTERM);
                io_exit(rct, irb, iorb->lk_iofail);
                break;
        case FC_SWITCH:
                RISC_ADDR(tcb, (struct TCB *), irb->i_tcb);
                tcb = (struct TCB *) ((char *) tcb - OFF_TCB);
                RISC_ADDR(ucb_ptr, (struct UCB *), tcb->t_ucbp);
                memcpy(person, &ucb_ptr->u_pid, 12);
                person[12] = '\0';
                if (ptr = (strchr(person, ' ')))
                    *ptr = '\0';
                for (i = 0; i < strlen(person); i++)
                {
                    if (isupper(person[i]))
                            person[i] = tolower(person[i]);
                }
                if (!(get_user(irb, iorb, person)))
                {
                    iorb->lk_fsfail = ACCESS_CONTROL_VIOL;
                    io_exit(rct, irb, SUCCESS_CODE);
                    return;
                }
                init_mqi(&rct->qaddr, 0);  /* mqi address for task server */
                syslog(LOG_INFO, "I576: NXSH Connect to LRN %d", lrn);
                exec_drvr(rct);
                rct->qaddr.isem.pid = pid;
                mqi_qot(&rct->qaddr, irb);
                break;
        default:
                io_exit(rct, irb, ILLEGAL_FUNCTION_CODE);
                break;
        }                               /* func code switch */
        return;
}                                       /* lnk_io */

/**********
* rtn_ttbl *
***********/
/*
* return an ftbl entry (sent by a child) to the available queue for FILE/PIPE.
* if the last file for this child return the ttbl entry as well & kill child.
*/
void
rtn_ttbl(struct LRB * iorb, struct RCT * rct, struct IRB * irb)
{
    GET4(math.adrs, iorb->lk_ftbl);
    ftbl = (struct FTBL *) math.ptr;
    GET4(math.adrs, iorb->lk_ftbl);
    lnkq_frm = (struct LQHEAD *) math.ptr;
    tskadr = (struct TTBL *) ftbl->tskadr;
    ftbl_head = (struct LQHEAD *) (&tskadr->flist.prio1);
    ftbl_head = lnk_dqh(ftbl_head, (ulong) lnkq_frm);
    if (ftbl_head == NULL)
    {
```

```
            syslog(LOG_ERR, "E591: Logic error in lnk_io!");
            exit(1);
    }
    iorb->lk_ftbl[0] = 0;
    iorb->lk_ftbl[0] = 0;
    ftbl->fd.fdes = 0;
    ftbl->tskadr = 0;
    lnk_qoh(qhdf, lnkq_frm, AVAIL_Q);    /* return to available queue */
    syslog(LOG_INFO, "I546: LNK disconnect LRN %d", lrn);
    ret_ddcor_rct(rct);
    if (!(tskadr->cnt))
    {
            hvx_clnp1a(&tskadr->tch.isem.pid, 0);
            tskadr->type = 0;
            lnkq_frm = lnk_dqh(qhdt, tskadr->tq.prio1);
            lnk_qoh(qhdt, lnkq_frm, AVAIL_Q);
    }
    return;
}                                         /* rtn_ttbl */

/************
 * exec_drvr *
 ************/
void
exec_drvr(struct RCT * rct)
{
    int         i, j = 1;
    char        *newargv[100];
    char        shmid[14];
    char        aplog[14];
    char        emain_pid[14];
    char        rct_addr[14];
    char        queue_addr[14];
    char        lrt_addr[14];
    char        task_addr[14];
    char        virv[14];
    char        private[4];
    int         emupid, oldmask;
    static char myname[MAXPATHLEN + 15];
    char        grp_path[MAXPATHLEN + 1];
    char        usr_name[20];

if (!rct)
    {
            lnk_cleanup();
            exit(1);
    }
    switch (rct->qaddr.internal_id)
    {
    case LINKP_ID:
            ptr = _PLNK;
            build_path(S_PLNK, tree);
            break;
    case LINKF_ID:
```

```
                ptr = _FLNK;
                build_path(S_FLNK, tree);
                break;
        case LINKI_ID:
                ptr = _ILNK;
                build_path(S_ILNK, tree);
                break;
        case CPX_ID:
                ptr = _CPX;
                build_path(S_CPX, tree);
                break;
        case NXSH_ID:
                ptr = _XSH;
                build_path(S_XSH, tree);
                break;
        case BSC_ID:
                ptr = _BSC;
                build_path(S_BSC, tree);
                break;
        default:
                break;
        }
        newargv[0] = myname;
        if (verbose)
                newargv[j++] = "-v";
        sprintf(shmid, "-s%d", opt.shmid);
        newargv[j++] = shmid;
        sprintf(aplog, "-D%d", plog);
        newargv[j++] = aplog;
        sprintf(virv, "-w%d", virt_view);
        newargv[j++] = virv;
        if (rct->qaddr.internal_id == NXSH_ID)
        {
                sprintf(emain_pid, "-p%x", mainpid);
                newargv[j++] = emain_pid;
        }
        if ((rct->qaddr.internal_id == LINKF_ID)
            || (rct->qaddr.internal_id == LINKI_ID)
            || (rct->qaddr.internal_id == NXSH_ID))
        {
                sprintf(lrt_addr, "-l%x", lrt);
                newargv[j++] = lrt_addr;
        }
        if (rct->qaddr.internal_id != LINKF_ID)
        {
                sprintf(rct_addr, "-R%x", rct);      /* LNK/CPX/XSH/BSC rct address */
                newargv[j++] = rct_addr;
        }
        sprintf(queue_addr, "-q%x", lnk_srvr);   /* LNK server MQI address */
        newargv[j++] = queue_addr;
        if ((rct->qaddr.internal_id == LINKP_ID)
            || (rct->qaddr.internal_id == LINKI_ID)
            || (rct->qaddr.internal_id == LINKF_ID))
        {
```

```
        sprintf(task_addr, "-t%x", tskadr);  /* LNK MQI address */
        newargv[j++] = task_addr;
}
if (!opt.private)
{
        sprintf(private, "-P");
        newargv[j++] = private;
}
if (rct->qaddr.internal_id != BSC_ID)
{
        sprintf(usr_name, "-u%s", person);
        newargv[j++] = usr_name;
}
newargv[j] = NULL;
if ((pid = fork()) == 0)
{
        setuid(getuid());
        close(0);
        close(1);
        close(2);
        open("/dev/null", O_RDWR);
        open("/dev/null", O_RDWR);
        open("/dev/null", O_RDWR);
        if (opt.private)
        {
           execvp(ptr, newargv);
           syslog(LOG_ERR, "E742: Exec of DDecor child failed %m %s", ptr);
        }
        else
        {
           execvp(tree, newargv);
           syslog(LOG_ERR, "E848: Exec of DDecor child failed %m %s", tree);
        }
        exit(1);
}                               /* child process */
else
if (pid <= 0)
{
        syslog(LOG_ERR, "E743: fork: %m");
}
}

/**************
* lnk_cleanup *
**************/
void
lnk_cleanup()
{
  int       j;
  struct TTBL    *ttbl;

ttbl = (struct TTBL *) (lnk_table + (2 * sizeof(struct LQHEAD)));
  for (j = 0; j < fdkey; j++, ttbl++)
  {
```

```
        hvx_clnp1a(&ttbl->tch.isem.pid, 0);
    }
    exit(0);
}                               /* lnk_cleanup */
```

```
/****************************************************************
 * Code of Host COPYX Server (920)
 ****************************************************************/ static union MATH math;
char        *srvr_base();
struct RCT  *rct;
char        *username;
int         mainpid, signo;
extern void srvrsegv();
extern void brk_pipe();
extern void
sigsak(), sigdanger1();
extern int  build_level;
char        buff[(1 << 15) + 1];
char        hostpath[MAXPATH];
int         mode;
static struct stat buffer;
struct LRB  *iorb;
struct IRB  *irb;
extern int  Uid;
FILE        *ipipe_stream, *opipe_stream;   /* dummies for linker */
struct MQI  *lnk_srvr;
char        person[14];

/*******
 * main *
 *******/
void
main(int argc, char *argv[], char *envp[])
{
    struct passwd   *pwent;
    static union MATH math;
    int         i, bytes_tran;

process = SERVER;
    sigset(SIGPIPE, brk_pipe);

pwent = getpwuid(getuid());
    if (pwent == NULL)
    {
        fprintf(stderr, "Unable to determine user name\n");
    }
    username = strdup(pwent->pw_name);
    openlog(username, LOG_PID, LOG_LOCAL0);
    setlogmask(LOG_MASK(LOG_ERR)
              | LOG_MASK(LOG_WARNING)
              | LOG_MASK(LOG_NOTICE));

if (parse_options(argc, argv, &opt) != 0)
    {
        syslog(LOG_ERR, "E678: : Invalid command line options");
    }
```

```
close_fd();

mainpid = getppid();
if ((base = shmat(opt.shmid, (char *) NULL, 0))
        == (char *) -1)
{
        syslog(LOG_ERR, "E679: : shmat: %m");
        exit(1);
}
init_vm();
if (intrp_vm())
{
        exit(1);
}
srvr_vm();

for (signo = 0; signo < NSIG; signo++)
{
        switch (signo)
        { case SIGCHLD:
        case SIGABRT:
        case SIGTERM:
           sigset(signo, SIG_DFL);
           break;

case SIGSAK:
           sigset(SIGSAK, sigsak);
           break;

case SIGDANGER:
           sigset(SIGDANGER, sigdanger1);
           break;

case SIGSEGV:
           sigset(SIGSEGV, srvrsegv);
           break;

default:
           sigset(signo, SIG_IGN);
           break;
        }
}                              /* endloop */ cpx_server();
}                              /* main */

/*************
 * cpx_server *
 *************/
void
cpx_server(void)
{
```

```c
        struct HDM     *hdm_base;
        int         pid;
        int         oldmask, stat, i;
        int         bytes_tran, bytes_needed;
        int         disc_detected = FALSE;
        char        *ptr;
        struct timestruc_t s_t, f_t;
        unsigned long   delta_us;

while (!disc_detected)
        {
            irb = (struct IRB *) mqi_dqh(&rct->qaddr);
/*          if (rct->qaddr.status & T_STAT)
                gettimer(TIMEOFDAY, &s_t);*/
            rct->qaddr.in_progress = 1;
            SRVR_RISC_ADDR(iorb, (struct LRB *), irb->i_rb, irb);
            iorb = (struct LRB *) ((char *) iorb - OFF_RB);
            rct = (struct RCT *) rct->qaddr.block;        /* start of neg portion */
/* do io */
            disc_detected = cpx_io();
            rct->qaddr.in_progress = 0;
            if (rct->qaddr.status & T_STAT)
            {
                gettimer(TIMEOFDAY, &f_t);
                delta_us = (f_t.tv_sec - s_t.tv_sec) * 1000000
                        + (f_t.tv_nsec - s_t.tv_nsec) / 1000;
                if (delta_us)
                {
                    rct->qaddr.io_time[1] += delta_us;
                    if (rct->qaddr.io_time[1] < delta_us)
                        rct->qaddr.io_time[0]++;
                }
            }
        }                               /* for */
/* sleep forever, the dual decor server will kill us in a moment */
        for (;;)
        {
            sleep(1000);
        }
}                                       /* cpx_server */

/****************
* parse_options *
****************/
int
parse_options(int argc, char **argv, struct EMU_OPTS * opt)

{
    unsigned int    lnk_rct, lnk_queue;
    int         o;
    extern char     *optarg;
    opt->private = TRUE;
    opt->rusage = FALSE;
    opt->pipe = FALSE;
```

```
while ((o = getopt(argc, argv, "PrVvw:s:R:q:u:")) != -1)
{
    switch (o)
    { case 'P':
        opt->private = FALSE;
        break;

case 'q':
        sscanf(optarg, "%x", &lnk_queue);
        lnk_srvr = (struct MQI *) lnk_queue;
        break;

case 'R':
        sscanf(optarg, "%x", &lnk_rct);
        rct = (struct RCT *) lnk_rct;
        break;

case 'V':
        hvx_verV(argv[0]);
        exit(0);
        break;

case 'v':
        closelog();
        openlog(username, LOG_PID, LOG_LOCAL0);
        setlogmask(LOG_MASK(LOG_ERR)
                 | LOG_MASK(LOG_WARNING)
                 | LOG_MASK(LOG_INFO)
                 | LOG_MASK(LOG_NOTICE)
                 | LOG_MASK(LOG_DEBUG));
        verbose = TRUE;
        break;

case 's':
        sscanf(optarg, "%d", &opt->shmid);
        break;

case 'u':
        sscanf(optarg, "%s", &person);
        break;

case 'w':
        sscanf(optarg, "%d", &virt_view);
        break;

default:
        break;

}                           /* switch */
}                               /* while */
if (argc == 1)
```

```
        return (1);
    else
        return (0);
}                           /* parse_options */

/*********
 * cpx_io *
 *********/
int
cpx_io(void)

{
    char        func_code;
    char        *ptr;
    int         i, access, bytes_tran;
    char        *newlineptr;
    int         string_length;
    int         status;

iorb->lk_fsfail = 0;
    func_code = iorb->lk_ct2 & mi_fc;

switch (func_code)
    {
    case CONN_FUNCTION:
        get_acl_qhead();

SRVR_RISC_ADDR(ptr, (char *), iorb->lk_adr, irb);
        if (getcuid())
        {
           syslog(LOG_ERR, "E853: hvx_cpx must run as root!");
           iorb->lk_fsfail = ACCESS_CONTROL_VIOL;
           io_exit(rct, irb, FAILURE_CODE);
           return 0;
        }
        access = get_access(ptr, person, LK_PIPE);
        if (access == -1)
        {
           syslog(LOG_ERR, "E749: CPX invalid path %s, user=%s", ptr, person);
           iorb->lk_fsfail = FILE_NOT_FOUND;
           io_exit(rct, irb, FAILURE_CODE);
           return 0;              /* invalid path */
        }
        if (!(access & EXEC_ACCL))
        {
           syslog(LOG_ERR, "E750: CPX permissions denied for %s, path=%s",
                   person, ptr);
           iorb->lk_fsfail = ACCESS_CONTROL_VIOL;
           io_exit(rct, irb, FAILURE_CODE);
           return 0;              /* no permissions this path */
        }
        status = stat(ptr, &buffer);
```

```c
if (status == -1)
{
  if (iorb->lk_dvs & mi_dir)
  {
        if (!(access & WRITE_ACCL))
        {
           syslog(LOG_ERR,
                   "E751: CPX permissions denied for %s,path=%s",
                   person, ptr);
           iorb->lk_fsfail = ACCESS_CONTROL_VIOL;
           io_exit(rct, irb, FAILURE_CODE);
           return 0;        /* no write permissions this path */
        }
        do
           rct->qaddr.fdes = open(ptr, O_WRONLY | O_TRUNC
                                  | O_CREAT, 0664);
        while ((rct->qaddr.fdes < 0) && (errno == EINTR));

if (rct->qaddr.fdes < 0)
        {
           syslog(LOG_ERR, "E510: CPX %s open failed: %m", ptr);
           io_exit(rct, irb, FAILURE_CODE);
           return 0;
        }
        do
           i = chown(ptr, Uid, -1);
        while ((i < 0) && (errno == EINTR));
        if (i < 0)
        {
           unlink(ptr);
           syslog(LOG_ERR, "E729: CPX %s chown failed: %m", ptr);
           io_exit(rct, irb, FAILURE_CODE);
           return 0;
        }
        strcpy(hostpath, ptr);
        mode = iorb->lk_dvs & mi_mod;
        rct->qaddr.status |= T_CONN;
        io_exit(rct, irb, SUCCESS_CODE);
        return 0;
  }                        /* write to a new file */
  else
  {
        syslog(LOG_ERR, "E752: CPX invalid path %s, user=%s",
            ptr, person);
        iorb->lk_fsfail = FILE_NOT_FOUND;
        io_exit(rct, irb, FAILURE_CODE);
        return 0;
  }
}
if (!(S_ISREG(buffer.st_mode)))
{
  syslog(LOG_ERR, "E511: CPX %s open failed: Not a regular file",
       ptr);
  iorb->lk_fsfail = FILE_NOT_FOUND;
```

```
        io_exit(rct, irb, FAILURE_CODE);
        return 0;
}
if (iorb->lk_dvs & mi_dir)
{
    access = get_access(ptr, person, LK_FILE);
    if (access == -1)
    {
        syslog(LOG_ERR, "E753: CPX invalid path %s, user=%s",
            ptr, person);
        iorb->lk_fsfail = FILE_NOT_FOUND;
        io_exit(rct, irb, FAILURE_CODE);
        return 0;   /* invalid path */
    }
    if (!(access & WRITE_ACCL))
    {
        syslog(LOG_ERR, "E754: CPX permissions denied for %s, path=%s",
            person, ptr);
        iorb->lk_fsfail = ACCESS_CONTROL_VIOL;
        io_exit(rct, irb, FAILURE_CODE);
        return 0;   /* no permissions this file */
    }
    do
        rct->qaddr.fdes = open(ptr, O_WRONLY | O_TRUNC, 0664);
    while ((rct->qaddr.fdes < 0) && (errno == EINTR));
}                           /* cpx direction is write */
else
{
    access = get_access(ptr, person, LK_FILE);
    if (access == -1)
    {
        syslog(LOG_ERR, "E755: CPX invalid path %s, user=%s",
            ptr, person);
        iorb->lk_fsfail = FILE_NOT_FOUND;
        io_exit(rct, irb, FAILURE_CODE);
        return 0;   /* invalid path */
    }
    if (!(access & READ_ACCL))
    {
        syslog(LOG_ERR, "E756: CPX invalid path %s, user=%s",
            ptr, person);
        iorb->lk_fsfail = ACCESS_CONTROL_VIOL;
        io_exit(rct, irb, FAILURE_CODE);
        return 0;   /* no permissions this file */
    } do
        rct->qaddr.fdes = open(ptr, O_RDONLY);
    while ((rct->qaddr.fdes < 0) && (errno == EINTR));

} if (rct->qaddr.fdes < 0)
{
```

```c
            syslog(LOG_ERR, "E512: CPX %s open failed: %m", ptr);
            io_exit(rct, irb, FAILURE_CODE);
            return 0;
        }                           /* open failure */ else
        {
            strcpy(hostpath, ptr);
            mode = iorb->lk_dvs & mi_mod;
            rct->qaddr.status |= T_CONN;
            io_exit(rct, irb, SUCCESS_CODE);
            return 0;
        } case WRITE_FUNCTION:
        SRVR_RISC_ADDR(ptr, (char *), iorb->lk_adr, irb);
        if (iorb->lk_ct2 & mi_b)   /* buffer starts in right byte */
            ptr++;
        if (iorb->lk_rng & 0x8000)
        {
            syslog(LOG_ERR, "E730: CPX max range exceeded");
            io_exit(rct, irb, FAILURE_CODE);
            return 0;
        }
        do
            bytes_tran = write(rct->qaddr.fdes, ptr, iorb->lk_rng);
        while ((bytes_tran < 0) && (errno == EINTR));

if (bytes_tran != iorb->lk_rng)
        {
            if (bytes_tran == -1)
                syslog(LOG_ERR, "E513: CPX %s write failed: %m",
                    rct->qaddr.filename);
            else
                syslog(LOG_ERR, "E514: CPX %s write failed",
                    rct->qaddr.filename);
            iorb->lk_st = mi_partial;
            iorb->lk_rsr = iorb->lk_rng - bytes_tran;
            io_exit(rct, irb, FAILURE_CODE);
            return 0;
        }                           /* write failure */
        if (mode)
        {
            do
                bytes_tran = write(rct->qaddr.fdes, "\n", 1);
            while ((bytes_tran < 0) && (errno == EINTR));

if (bytes_tran != 1)
            {
                if (bytes_tran == -1)
                    syslog(LOG_ERR, "E515: CPX %s write failed: %m",
                        rct->qaddr.filename);
                else
                    syslog(LOG_ERR, "E516: CPX %s write failed",
```

```
                            rct->qaddr.filename);
                iorb->lk_rsr = 0;
                io_exit(rct, irb, FAILURE_CODE);
                return 0;
        }
    }                                       /* text transfer */
    iorb->lk_st = 0;
    iorb->lk_rsr = 0;
    io_exit(rct, irb, SUCCESS_CODE);
    return 0;

case READ_FUNCTION:
    SRVR_RISC_ADDR(ptr, (char *), iorb->lk_adr, irb);
    if (iorb->lk_ct2 & mi_b)    /* buffer starts in right byte */
        ptr++;
    if (iorb->lk_rng & 0x8000)
    {
        syslog(LOG_ERR, "E731: CPX max range exceeded");
        io_exit(rct, irb, FAILURE_CODE);
        return 0;
    }
    if (mode)
    {
      do
            bytes_tran = read(rct->qaddr.fdes, buff, iorb->lk_rng);
      while ((bytes_tran < 0) && (errno == EINTR));

if (bytes_tran == -1)
      {
            syslog(LOG_ERR, "E517: CPX %s read failed: %m",
                    rct->qaddr.filename);
            iorb->lk_rsr = iorb->lk_rng;
            iorb->lk_st = mi_partial;
            io_exit(rct, irb, FAILURE_CODE);
            return 0;
      }
      newlineptr = memchr(buff, '\n', bytes_tran);
      if (!newlineptr)
      {
            memcpy(ptr, buff, bytes_tran);
            iorb->lk_rsr = iorb->lk_rng - bytes_tran;
            if (bytes_tran == 0)
            {
               iorb->lk_st = mi_eof;
               io_exit(rct, irb, FAILURE_CODE);
            }
            else
            {
               iorb->lk_st = mi_partial;
               io_exit(rct, irb, SUCCESS_CODE);
            }
            return 0;
      }
```

```
                string_length = (int) newlineptr - (int) buff;
                memcpy(ptr, buff, string_length);
                lseek(rct->qaddr.fdes, string_length + 1 - bytes_tran, SEEK_CUR);
                iorb->lk_rsr = iorb->lk_rng - string_length;
                iorb->lk_st = 0;
                io_exit(rct, irb, SUCCESS_CODE);
                return 0;
        }                               /* text transfer */
        else
        {
            do
                    bytes_tran = read(rct->qaddr.fdes, ptr, iorb->lk_rng);
            while ((bytes_tran < 0) && (errno == EINTR));

if (bytes_tran == -1)
            {
                    syslog(LOG_ERR, "E518: CPX %s read failed: %m",
                        rct->qaddr.filename);
                    iorb->lk_rsr = iorb->lk_rng;
                    iorb->lk_st = mi_partial;
                    io_exit(rct, irb, FAILURE_CODE);
                    return 0;
            }
            if (bytes_tran == 0)
            {
                    iorb->lk_rsr = iorb->lk_rng;
                    iorb->lk_st = mi_eof;
                    io_exit(rct, irb, FAILURE_CODE);
                    return 0;
            }
            if (bytes_tran != iorb->lk_rng)
            {
                    iorb->lk_rsr = iorb->lk_rng - bytes_tran;
                    iorb->lk_st = mi_partial;
                    io_exit(rct, irb, SUCCESS_CODE);
                    return 0;
            }
            iorb->lk_rsr = 0;
            iorb->lk_st = 0;
            io_exit(rct, irb, SUCCESS_CODE);
            return 0;
        }                               /* binary transfer */ case DISC_FUNCTION:
        if (rct->qaddr.status & T_CONN)
        {
            do
                    status = close(rct->qaddr.fdes);    /* close the original
                                                         * file */
            while ((status < 0) && (errno == EINTR));

if (!(iorb->lk_dvs & mi_purg))
            {
                    access = get_access(hostpath, person, LK_PIPE);
```

```
                if ((access == -1) || (!(access & WRITE_ACCL)))
                {
                    syslog(LOG_ERR,
                            "E760: CPX permissions denied for %s, path=%s",
                            person, hostpath);
                    iorb->lk_fsfail = ACCESS_CONTROL_VIOL;
                    iorb->lk_iofail = FAILURE_CODE;
                }
                else
                    unlink(hostpath);
            }
            rct->qaddr.fdes = -1;
        }                               /* connected */ rct->qaddr.status &= ~T_CONN;
        iorb->lk_ct2 += FUNC_DELTA;
        mqi_qot(lnk_srvr, irb);
        return 1;

default:
        io_exit(rct, irb, ILLEGAL_FUNCTION_CODE);
        return 0;
    }                                   /* switch */
}                                       /* cpx_io */
```

APPENDIX B

CPX COMMAND EXAMPLES

Example 1:

CPX >>START_UP.EC "x:/usr/local/start_up.sv" -T

Copies of the emulated system file START_UP.EC from the boot disk root directory to the current directory on the host system and names it start_up.sv. The copy is done in text mode.

Example 2:

CPX "X:/usr/hvx/clm/clm_x" TEMP.1

Copies the host file clm_x to the emulated system file TEMP.1. The file TEMP.1 is a string-relative file. The characters "x:" can be upper case or lower case.

Example 3:

CPX "x:/usr/local/src/prog.c" ^USER>DATA>PROG.C -TEXT -S_R -LS

Copies the host file /usr/local/src/prog.c to an emulated system file named ^USER>DATA>PROG.C. The transfer is in ASCII mode. The emulated system file is a string-relative file, and message confirmation is specified.

Example 4:

CPX "x:/gcos/new/Z3EXECUTIVEL" Z3EXEC.NEW
-CLONE >>Z3EXECUTIVEL -B -LS

Copies the host file /cgos/new/Z3EXECUTIVEL to the emulated system file Z3EXEC.NEW. The file Z3EXEC.NEW is given the attributes of the emulated system file Z3EXECUTIVEL. The copy is in binary mode, and message confirmation is specified.

It will be apparent to those skilled in the art that many changes may be made to the preferred embodiment of the present invention.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A host system having a memory organized into shared and host memory areas and a hardware platform including a plurality of input/output devices operatively connected for executing host system instructions and for emulating the execution of emulated system instructions by an emulator running as an application process on said host system, said plurality of input/output devices including input/output devices for storing files contained within emulated system and host file systems, said emulator including a number of emulated system executive service components operating in said shared memory area comprising a command handler unit and file management component operatively coupled to said command handler unit for managing files of said emulated system file system and an interpreter, an emulator monitor call unit (EMCU) and server facilities operating in said host memory area, said host system further including operating system facilities for providing a number of services for host programs, said operating system facilities being coupled to said plurality of input/output devices and to said EMCU, said host system further including a copy file facility for transferring files between said host and emulated system file systems, said copy file facility comprising:

copy command handler means included within said command handler unit, said command handler means in response to each copy file command specifying access to a file within said host file system generating a special monitor call to said EMCU for causing a request input/output operation to be issued to said server facilities;

a user table (USTBL) mechanism located in said host memory area, said USTBL mechanism having a number of locations for storing unique user description entries generated by said EMCU for emulated system users whose identities were previously validated during login; and, said server facilities including first server handler means including user security validation means, said security validation means in response to an input/output request generated by said copy command handler means in response to an emulated system user copy file command issued for transferring a host file, performing a validation operation on said emulated system user by accessing said user table mechanism entry associated with said user requesting access to ascertain that said copy file command was issued by a trusted user and would not compromise host system security and second server means coupled to said first server handler means, said second server means receiving said input/output request for performing the execution of copy file command only when said validation operation confirms that the command was issued by a trusted user.

2. The host system of claim 1 wherein said second server means includes access control means for performing an access control check for establishing that said emulated system user has the required access permissions to execute the file copy command for transferring a file between said host and emulated file systems.

3. The host system of claim 2 wherein said second server means performs said validation of access permissions by said access control means at a time when file access is to take place which corresponds to an open command.

4. The host system of claim 2 wherein said operating system includes Inode permission files defining access permissions for each file of said host system, said access control means generating a number of system calls to said operating system for validating user access on the basis of both basic and extended permissions defined by said Inode permission files.

5. The host system of claim 1 wherein each unique user description entry includes emulated system descriptive information associated with the user by said executive service components which is not modifiable by the user.

6. The host system of claim 5 wherein said emulated system descriptive information used to perform said validation operation includes a first portion containing user-id information and second and third portions containing addresses of predetermined data structures used by the executive service components to uniquely identify the user.

7. The host system of claim 6 wherein said first server handler means performs said validation operation by comparing the portions of said emulated system user descriptive information previously stored in said user table mechanism as an entry for the user with corresponding portions of emulated system user descriptive information obtained from said emulated memory area obtained by said first server handler means which is associated with a current user issuing said copy file command.

8. The host system of claim 7 wherein said first server handler means upon determining that there is no identical comparison indicating that the current user is untrustworthy, signals the occurrence of a user security violation and does not initiate a series of operations for enabling execution of the copy file command.

9. The host system of claim 7 wherein said first server handler means upon determining that there is an identical comparison identifying no change in user personality confirming that the current user is trustworthy, initiates a series of operations for enabling execution of the copy file command.

10. The host system of claim 1 wherein said copy file command is a new command added to a set of commands utilized by said emulated system.

11. The host system of claim 10 wherein said copy file command has a predetermined format having a number of different portions, a first portion being coded to specify a new command code for invoking said command handler means, a second portion being coded for designating a complete path name of a source file to be copied, a third portion being coded for designating a complete path name of a destination file to be copied to wherein one of said second and third portions has a pathname which is preceded by a predetermined prefix indicating a host file pathname.

12. The host system of claim 11 wherein said number of different portions further includes a number of optional control arguments coded for designating file type or emulated system file attributes.

13. The host system of claim 12 wherein a first group of said control arguments is coded to designate whether a file is being copied as a binary file or as a text (ASCII) file and said copy command handler means including means for converting a file transferred from said host file system into a format designated by said first group of said control arguments contained in said copy file command.

14. The host system of claim 12 wherein said first group of optional control arguments are formatted as follows: -BINARY|-B|-TEXT|-T.

15. The host system of claim 12 wherein a second group of said control arguments is coded to designate one of a number of different options including setting file attributes to create a file having the same attributes as an existing emulated system file specified by a specified pathname, setting file attributes to create a first type of emulated system file organization and setting file attributes to create a second type of emulated system file organization and said copy command handler means converting a file transferred from said host file system into a file containing one of said different options specified by said copy file command.

16. The host system of claim 15 wherein said second group of control arguments are formatted as follows: [-CLONE clone__pathname|-SEQ|-S__R].

17. The host system of claim 12 wherein a third group of control arguments are coded to specify how a copy file operation is to be completed and said copy command handler means including means for causing said file management component to perform an operation specified by said third group of optional arguments.

18. The host system of claim 17 wherein said third group of control arguments are formatted as follows: -DELETE|-LIST|-LS.

19. The host system of claim 12 wherein said copy command handler means includes means for verifying that said pathnames, file types and file attributes are valid.

20. The host system of claim 1 wherein said copy command handler means includes buffer means for transferring predetermined size portions of said host file which are larger than sizes used in an emulated system file for increasing efficiency.

21. The host system of claim 20 wherein said size is calculated in a predetermined manner for maximizing efficiency.

* * * * *